US012795357B2

(12) United States Patent
Huang et al.

(10) Patent No.: US 12,795,357 B2
(45) Date of Patent: Nov. 10, 2026

(54) MULTI-LINK DEVICE RESETUP AND TRANSITION WITH STATION DEVICE ADDRESS AUTHENTICATION

(71) Applicant: Intel Corporation, Santa Clara, CA (US)

(72) Inventors: Po-Kai Huang, San Jose, CA (US); Laurent Cariou, Milizac (FR)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/401,366

(22) Filed: Dec. 30, 2023

(65) Prior Publication Data

US 2024/0155339 A1 May 9, 2024

Related U.S. Application Data

(63) Continuation of application No. 17/315,287, filed on May 8, 2021, now abandoned.

(Continued)

(51) Int. Cl.

*H04W 12/0431* (2021.01)
*H04W 12/06* (2021.01)

(Continued)

(52) U.S. Cl.

CPC ....... *H04W 12/0431* (2021.01); *H04W 12/06* (2013.01); *H04W 12/08* (2013.01); *H04W 12/73* (2021.01)

(58) Field of Classification Search

CPC . H04W 12/0431; H04W 12/06; H04W 12/08; H04W 12/73; H04W 12/10; H04W 12/76; H04W 12/069

See application file for complete search history.

(56) References Cited

U.S. PATENT DOCUMENTS 8,331,293 B2 * 12/2012 Sood ..................... H04L 47/786 455/452.2

11,140,725 B2 * 10/2021 Mestanov ............. H04W 76/10

(Continued)

OTHER PUBLICATIONS

IEEE Std 802.11™-2012, Part 11: Wireless LAN Medium Access Control (MAC) and Physical Layer (PHY) Specifications (Year: 2012).*

(Continued)

*Primary Examiner* — Andrew Suh

(74) *Attorney, Agent, or Firm* — Gray Ice Higdon, PLLC

(57) ABSTRACT

This disclosure describes systems, methods, and devices related to multi-link device (MLD) device resetup and transition. A device may perform an initial association with a first transition peer. The device may initiate a fast multi-link device (MLD) transition from the first transition peer to a second transition peer, wherein the MLD is configured to use authentication keys, and wherein at least one of the first transition peer or the second transition peer it is an access point (AP) MLD having a plurality of links associated with a plurality of APs within the AP MLD. The device may include an MLD link identification (ID) within a fast basic service set transition element (FTE) of a reassociation request or reassociation response frame, wherein the MLD link ID identifies an individual link of the plurality of links. The device may perform a second association with the second transition peer.

15 Claims, 17 Drawing Sheets

Related U.S. Application Data

(60) Provisional application No. 63/022,256, filed on May 8, 2020.

(51) Int. Cl.

| | |
|---|---|
| ***H04W 12/069*** | (2021.01) |
| ***H04W 12/08*** | (2021.01) |
| ***H04W 12/10*** | (2021.01) |
| ***H04W 12/73*** | (2021.01) |
| ***H04W 12/76*** | (2021.01) |

(56) References Cited

U.S. PATENT DOCUMENTS

| | | | | |
|---|---|---|---|---|
| 12,126,996 | B2 * | 10/2024 | Tachibana | H04W 12/069 |
| 2020/0267541 | A1 * | 8/2020 | Huang | H04W 12/10 |
| 2021/0120602 | A1 * | 4/2021 | Huang | H04W 8/02 |
| 2021/0282007 | A1 * | 9/2021 | Ho | H04W 12/041 |
| 2023/0024407 | A1 * | 1/2023 | Gan | H04W 48/08 |

OTHER PUBLICATIONS

Chapter 12.Fast BSS transition, pp. 1308-1351, IEEE Std 802.11™-2012, Part 11: Wireless LAN Medium Access Control (MAC) and Physical Layer (PHY) Specifications (Year: 2012).*

Part 11: Wireless LAN Medium Access Control (MAC) and Physical Layer (PHY) Specifications (Year: 2012).*

* cited by examiner

400

MULTI-LINK DEVICE RESETUP AND TRANSITION WITH STATION DEVICE ADDRESS AUTHENTICATION

CROSS-REFERENCE TO RELATED PATENT APPLICATION(S)

This application is a continuation of U.S. Non-Provisional application Ser. No. 17/315,287, filed May 8, 2021, which claims the benefit of U.S. Provisional Application No. 63/022,256, filed May 8, 2020, the disclosures of which are incorporated herein by reference as if set forth in full.

TECHNICAL FIELD

This disclosure generally relates to systems and methods for wireless communications and, more particularly, to multi-link device (MLD) resetup and transition with station device (STA) address authentication.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Station device (STA) addresses of a multi-link device (MLD) needs to be authenticated in fast basic service set (BSS) transition (FT) 4-way handshake and over-the-air FT protocol. A MLD service set identifier (SSID) is decided, and the definition of MLD in an extended service set (ESS) needs to be generalized. There is no previous solutions for STA addresses authentication in FT 4-way handshake and over-the-air FT protocol. There is no previous solutions for generalizing MLD concept in an ESS. There is no previous solutions for STA addresses authentication in FT 4-way handshake and over-the-air FT protocol. There is no previous solutions for generalizing MLD concept in an ESS.

Example embodiments of the present disclosure relate to systems, methods, and devices for MLD resetup and transition.

In one embodiment, a MLD device resetup and transition system may generalize ESS definition for MLD under the MLD SSID.

In one embodiment, a MLD device resetup and transition system may authenticate the STA addresses in FT 4-way handshake and over-the-air FT protocol.

ESS definition for MLD under the MLD SSID is defined. Authenticating the STA addresses in FT 4-way handshake and over-the-air FT protocol prevents problem that fake STA address is used after 4-way handshake.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
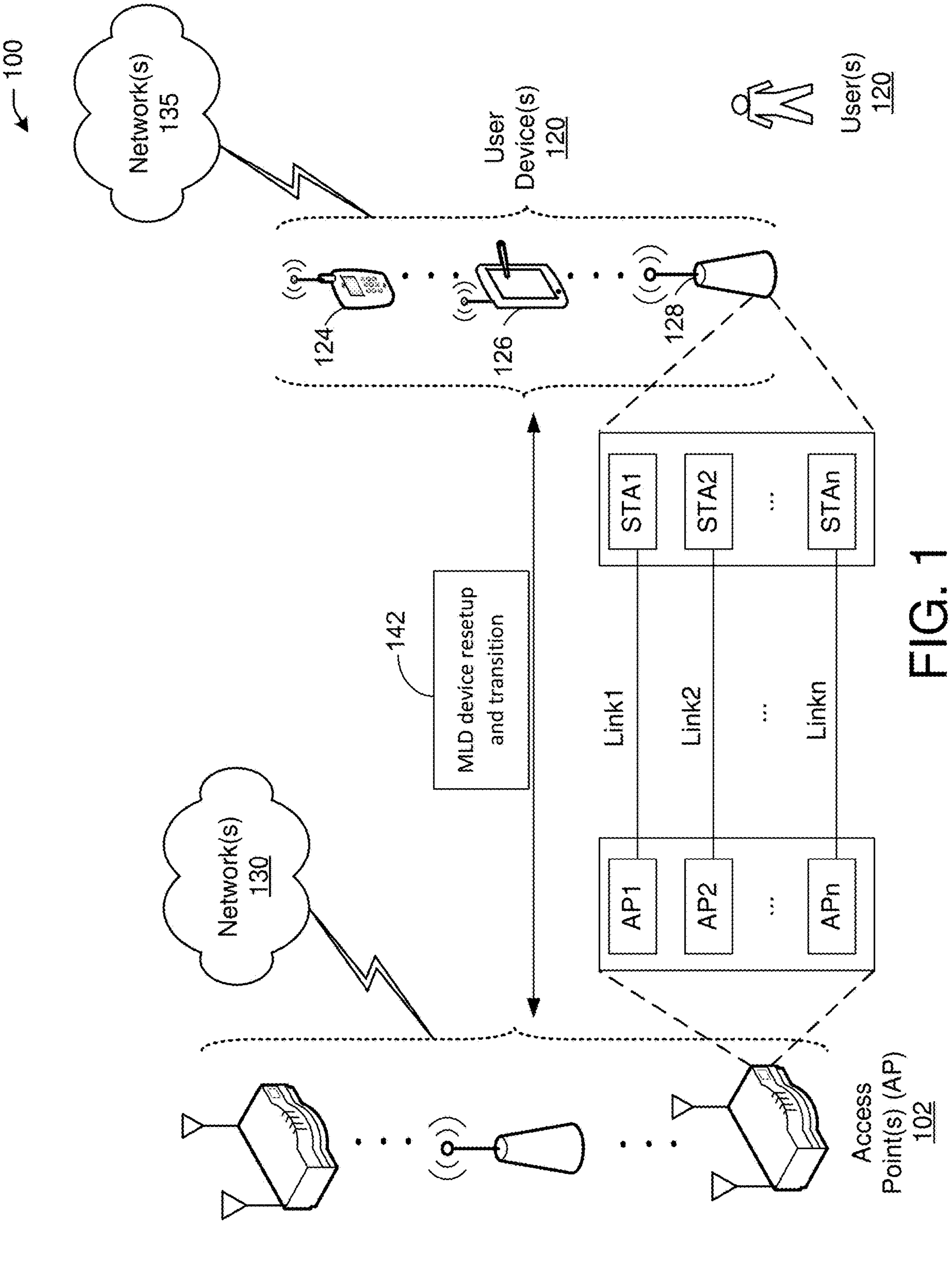
FIG. 1 is a network diagram illustrating an example network environment for MLD device resetup and transition, in accordance with one or more example embodiments of the present disclosure.

FIG. 1 is a network diagram illustrating an example network environment of MLD device resetup and transition, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 12:
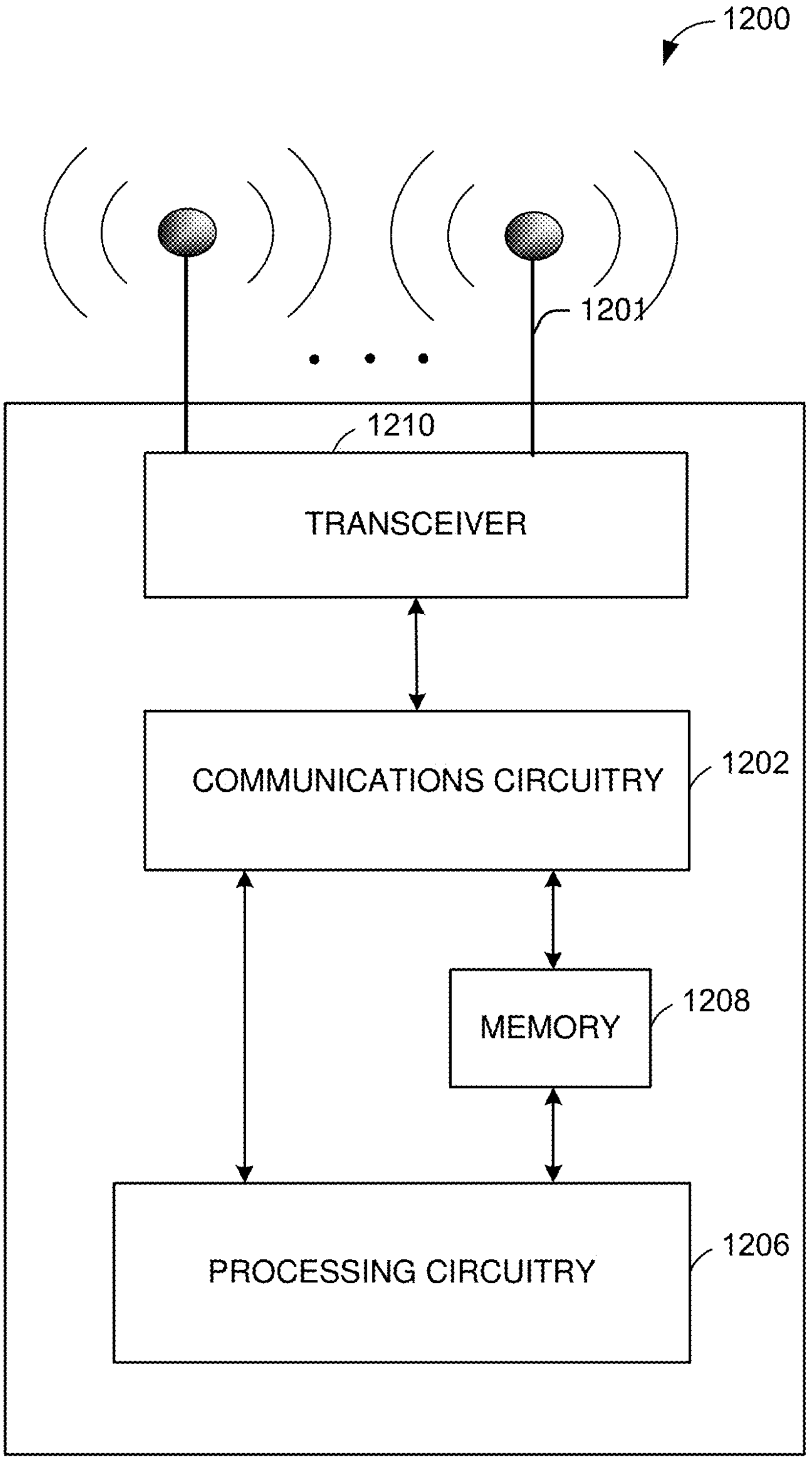
FIG. 12 illustrates a functional diagram of an exemplary communication station that may be suitable for use as a user device, in accordance with one or more example embodiments of the present disclosure.
Figure 13:
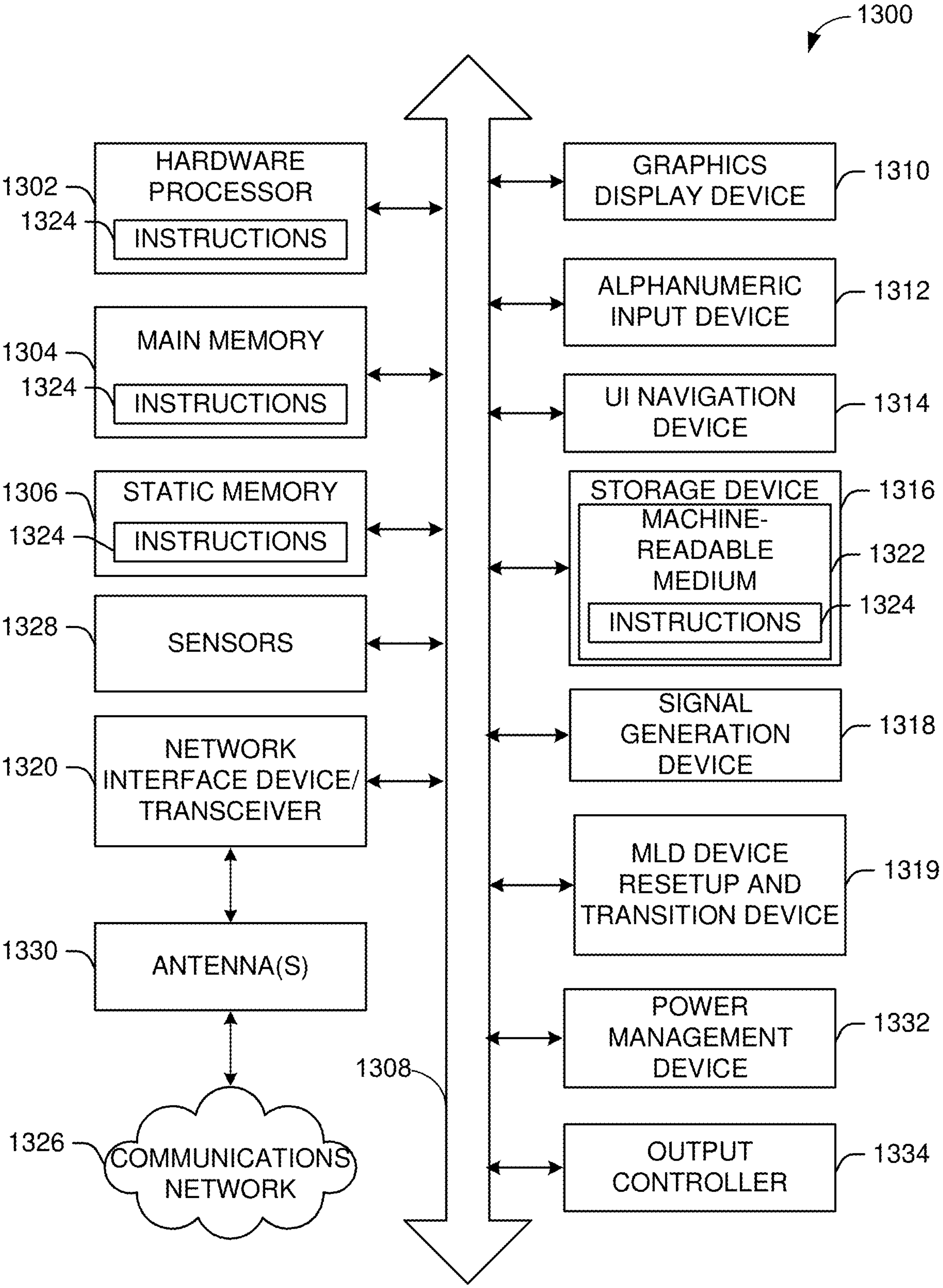
FIG. 13 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 12 and/or the example machine/system of FIG. 13.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11 ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102. For example, one or more APs 102 may implement a MLD device resetup and transition 142 with one or more user devices 120. The one or more APs 102 may be multi-link devices (MLDs) and the one or more user device 120 may be non-AP MLDs. Each of the one or more APs 102 may comprise a plurality of individual APs (e.g., AP1, AP2, . . . , APn, where n is an integer) and each of the one or more user devices 120 may comprise a plurality of individual STAs (e.g., STA1, STA2, STAn). The AP MLDs and the non-AP MLDs may set up one or more links (e.g., Link1, Link2, Linkn) between each of the individual APs and STAs. It is understood that the above descriptions are for purposes of illustration and are not meant to be limiting.

Figure 2:
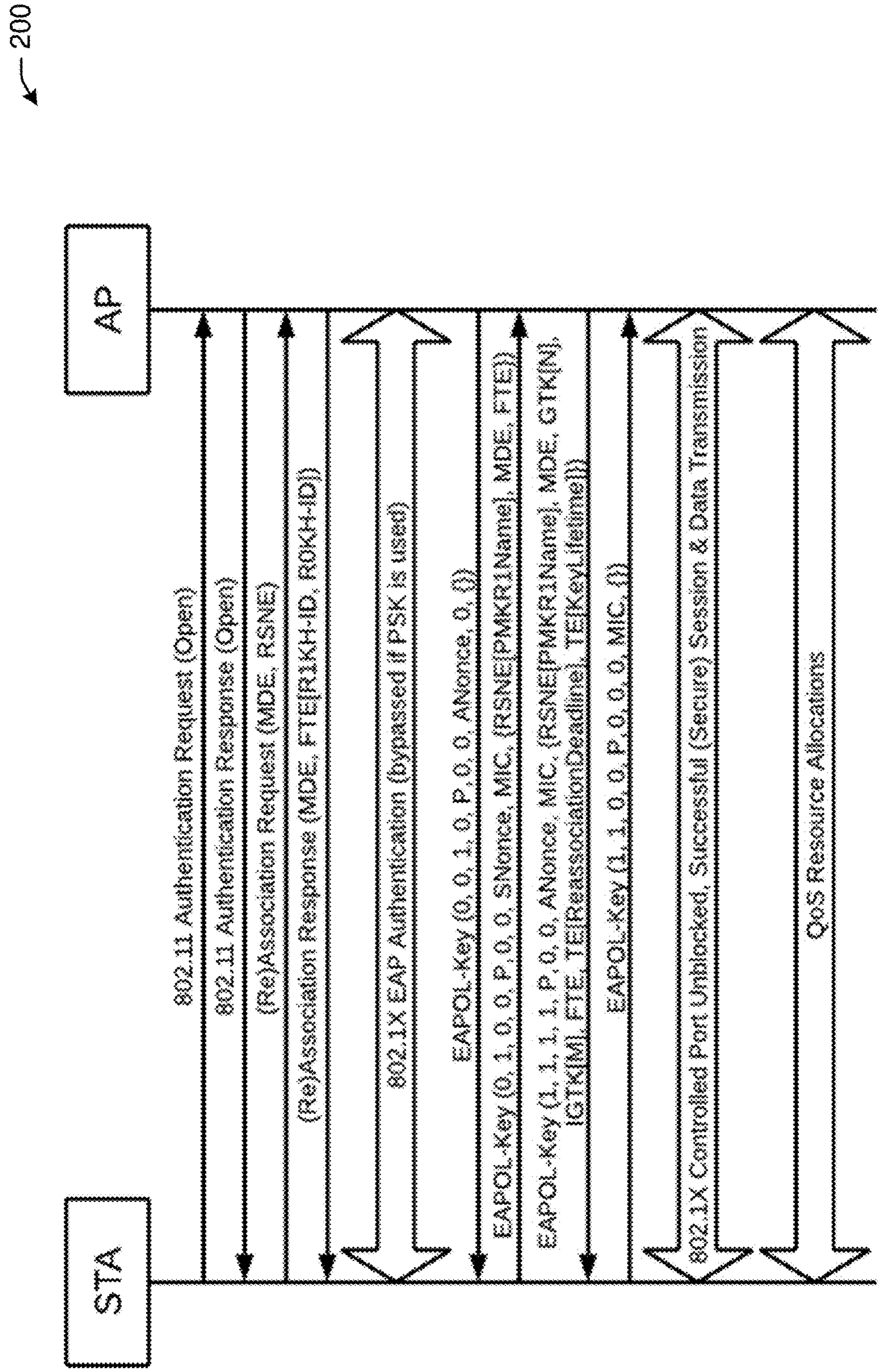
FIG. 2 illustrates a fast basic service set (BSS) transition (FT) initial mobility domain setup, in accordance with one or more example embodiments of the present disclosure.

FIG. 2 illustrates an FT initial mobility domain setup 200, in accordance with one or more example embodiments of the present disclosure. In particular, FIG. 2 illustrates a flow for the initial association in an RSN between a STA and an AP, including an authentication request/response exchange to achieve open system authentication, which admits any STA to the DS. After the authentication request/response exchange, an association request/response is used to exchange mobility domain information in mobility domain element (MDE) and FT information in a Fast BSS Transition element (FTE). Then 802.1X EAP authentication is used to generate Pairwise Master Key (PMK)-R0, to be used to generate any PMK-R1, and PMK-R1 between the pair of AP and STA. A FT 4-way handshake is used to generate the Pairwise Transit Key (PTK) and deliver GTK, IGTK, BIGTK.

Currently, when a STA associates with an AP, the STA can associate with another AP by simply sending another reassociation frame.

FAST basic service set (BSS) transition (FT) is used to simplify roaming procedure from one AP to another AP in the same mobility domain.

The definition of mobility domain is the following.

Basic service set (BSS): A set of stations (STAs) that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

Mobility domain: A set of basic service sets (BSSs), within the same extended service set (ESS), that support fast BSS transitions between themselves and that are identified by the set's mobility domain identifier (MDID).

Extended service set (ESS): An ESS is the union of the infrastructure BSSs with the same SSID connected by a DS. The ESS does not include the DS.

There are two parts of the FT.

1) FT initial mobility domain association as described in 13.4 FT initial mobility domain association.

This procedure describes the first step to associate with an AP in a mobility domain.

The common procedure is FT initial mobility domain association in an RSN as described in 13.4.2 FT initial mobility domain association in a robust security network (RSN).

2) FT protocol as described in 13.5 FT protocol.

This procedure describes how a STA moves from one AP to another AP in a mobility domain.

The common procedure is Over-the-air FT protocol authentication in an RSN as described in Over-the-air FT protocol authentication in an RSN.

The basic flow for the initial association is the following, and a figure is shown in FIG. 13-2 of the specification.

Authentication request/response exchange to achieve open system authentication, which admits any STA to the DS.

Association request/response to exchange mobility domain information in mobility domain element (MDE) and FT information in Fast BSS Transition element (FTE).

802.1X extensive authentication protocol (EAP) authentication to generate PMK-R0, to be used to generate any PMK-R1, and PMK-R1 between the pair of AP and STA.

FT 4-way handshake to generate PTK and deliver GTK, IGTK, BIGTK.

It is understood that the above descriptions are for purposes of illustration and are not meant to be limiting.

Figure 3:
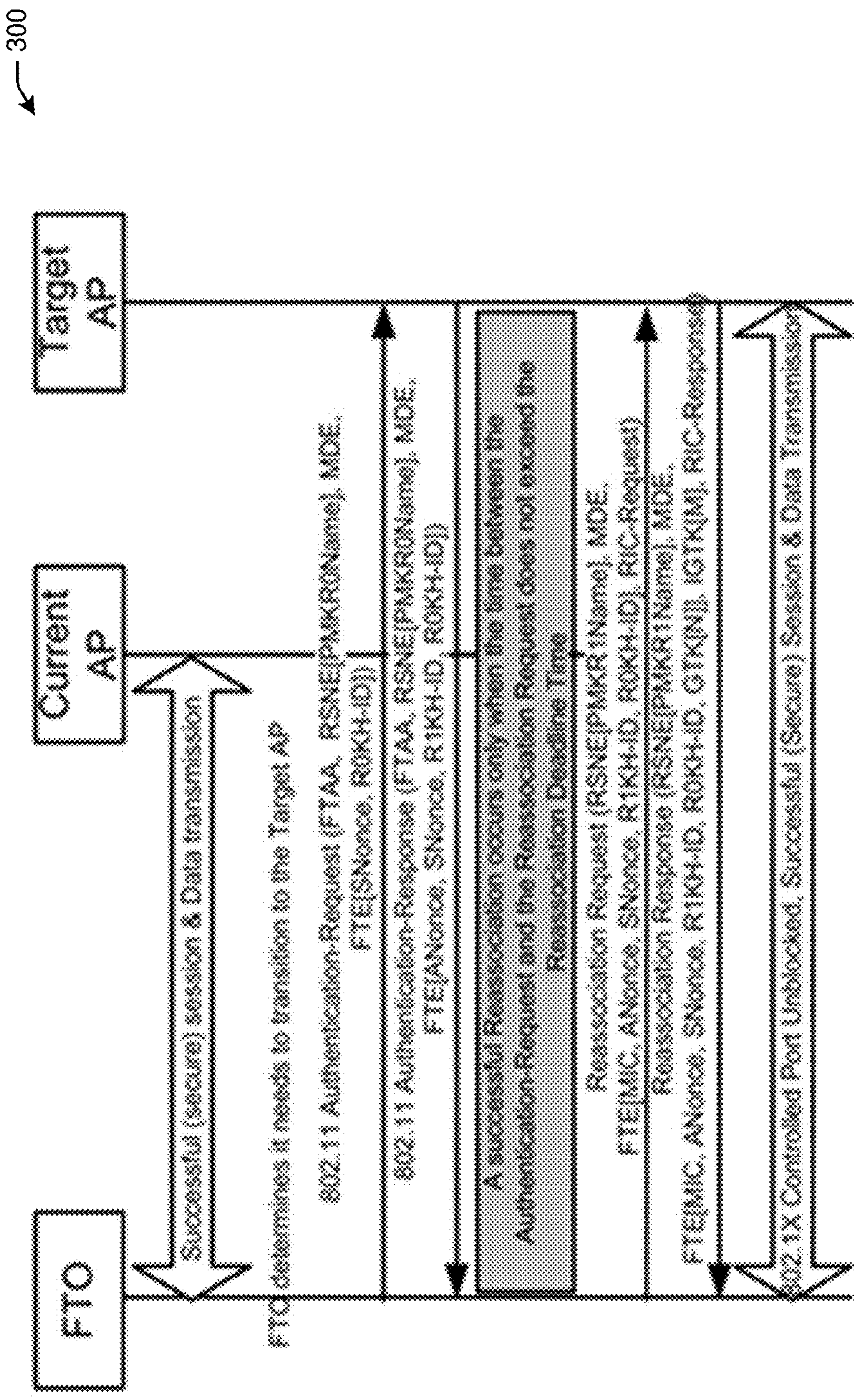
FIG. 3 illustrates over-the-air FT protocol, in accordance with one or more example embodiments of the present disclosure.

FIG. 3 illustrates over-the-air FT protocol 300, in accordance with one or more example embodiments of the present disclosure. In particular, FIG. 3 illustrates transition between a current AP and a Target AP. As shown, the flow for the roaming in an RSN includes the STA or FTO performing FT authentication to generate a PTK based on the PMK-R1 between the STA and the target AP. PMK-R1 is generated based on PMK-R0. The STA or FTO performs a reassociation request/response exchange with the target AP. GTK, IGTK, BIGTK are delivered by the target AP in the FTE carried in the reassociation response. In the Authentication-Request frame of FIG. 3, the SA field of the message header is set to the MAC address of the FTO, and the DA field of the message header is set to the BSSID of the target AP. In the Authentication-Response frame, the SA field of the message header is set to the BSSID of the target AP, and the DA field of the message header is set to the MAC address of the FTO.

Figure 5:
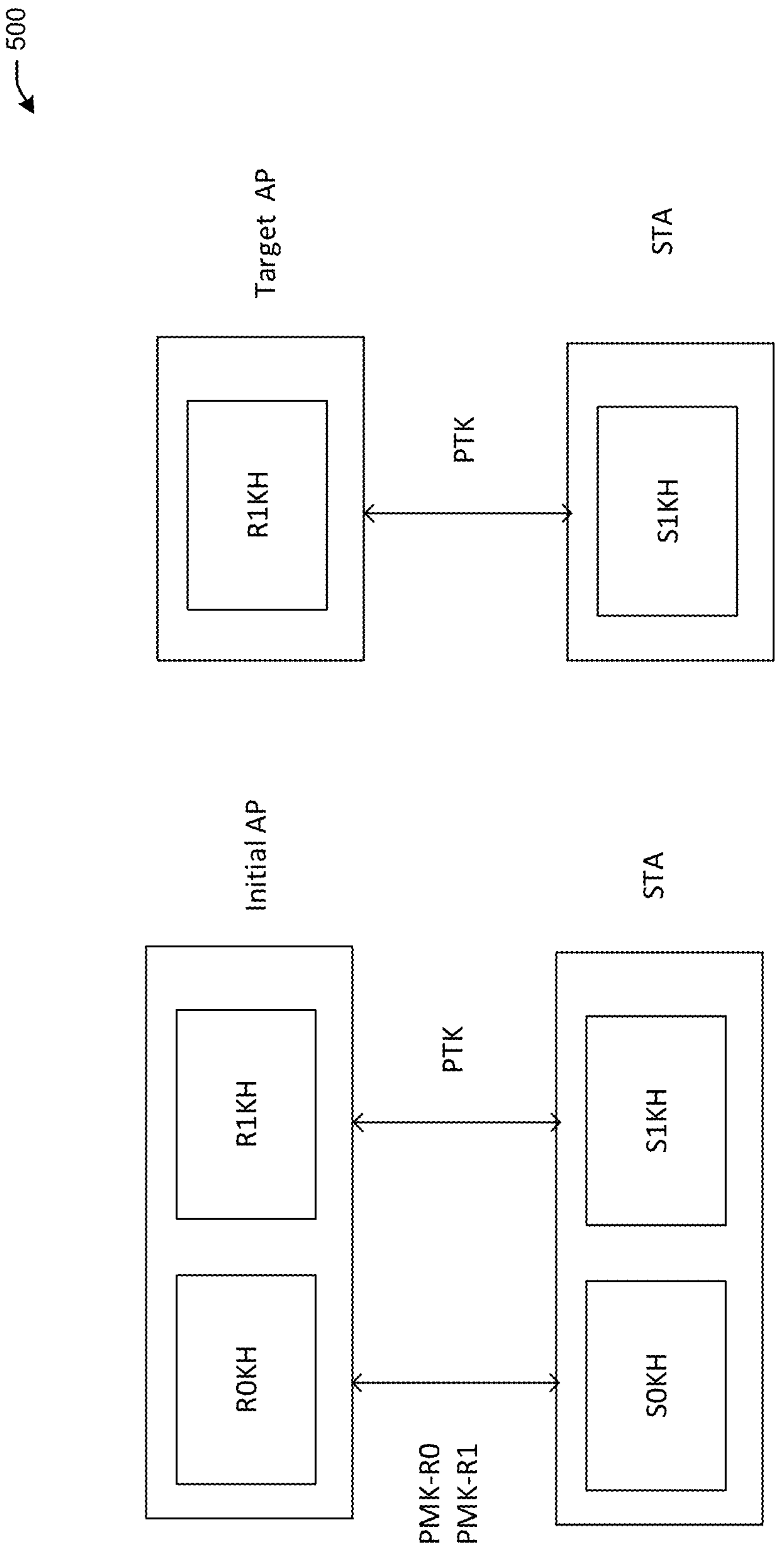
FIG. 5 illustrates a key exchange, in accordance with one or more example embodiments of the present disclosure.

The basic flow for the roaming is the following, and a figure is shown in FIG. 13-5 of the spec.

STA or FTO does FT authentication to generate PTK based on the PMK-R1 between STA and target AP. PMK-R1 is generated based on PMK-R0.

STA or FTO does reassociation request/response exchange with target AP.

GTK, IGTK, BIGTK are delivered by target AP in FTE carried in the reassociation response.

In the Authentication-Request frame, the SA field of the message header shall be set to the MAC address of the FTO, and the DA field of the message header shall be set to the BSSID of the target AP.

In the Authentication-Response frame, the SA field of the message header shall be set to the BSSID of the target AP, and the DA field of the message header shall be set to the MAC address of the FTO.

Figure 4:
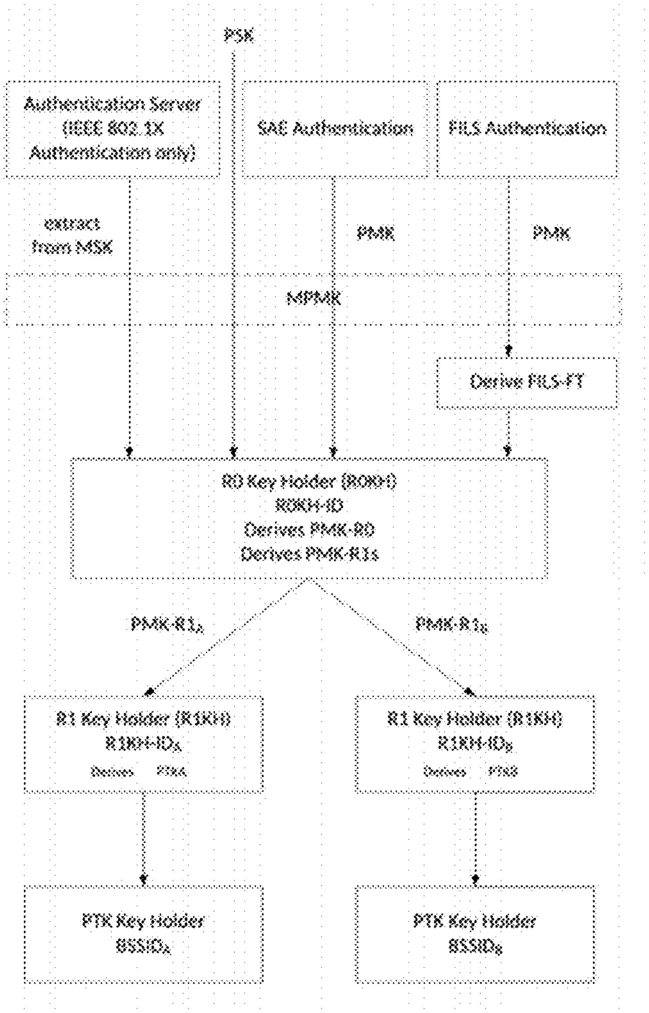
FIG. 4 illustrates FT key hierarchy at authentication, in accordance with one or more example embodiments of the present disclosure.

FIG. 4 illustrates FT key hierarchy at authentication 400, in accordance with one or more example embodiments of the present disclosure.

FIG. 5 illustrates a key exchange 500, in accordance with one or more example embodiments of the present disclosure.

On the AP side, the R0 key holder (R0KH) interacts with the IEEE 802.1X Authenticator to receive the MSK resulting from an EAP authentication. The R0KH generates PMK-R0 and PMK-R1. Each PMK-R1 is for an AP and STA pair. The R1 key holder (R1KH) interacts with the IEEE 802.1X Authenticator to open the Controlled Port.

On the STA side, the S0 key holder (S0KH) interacts with the IEEE 802.1X functional block. This is shown in FIG. 4-24 (Portion of the ISO/IEC basic reference model covered in the IEEE 802.11be standard) in 4.9 (Reference model)) to receive the MSK resulting from an EAP authentication or the (#114) FILS-FT resulting from a FILS authentication (11ai). The S1 Key holder (S1KH) interacts with the IEEE 802.1X entity to open the Controlled Port (FT 4 way handshake).

Figure 6:
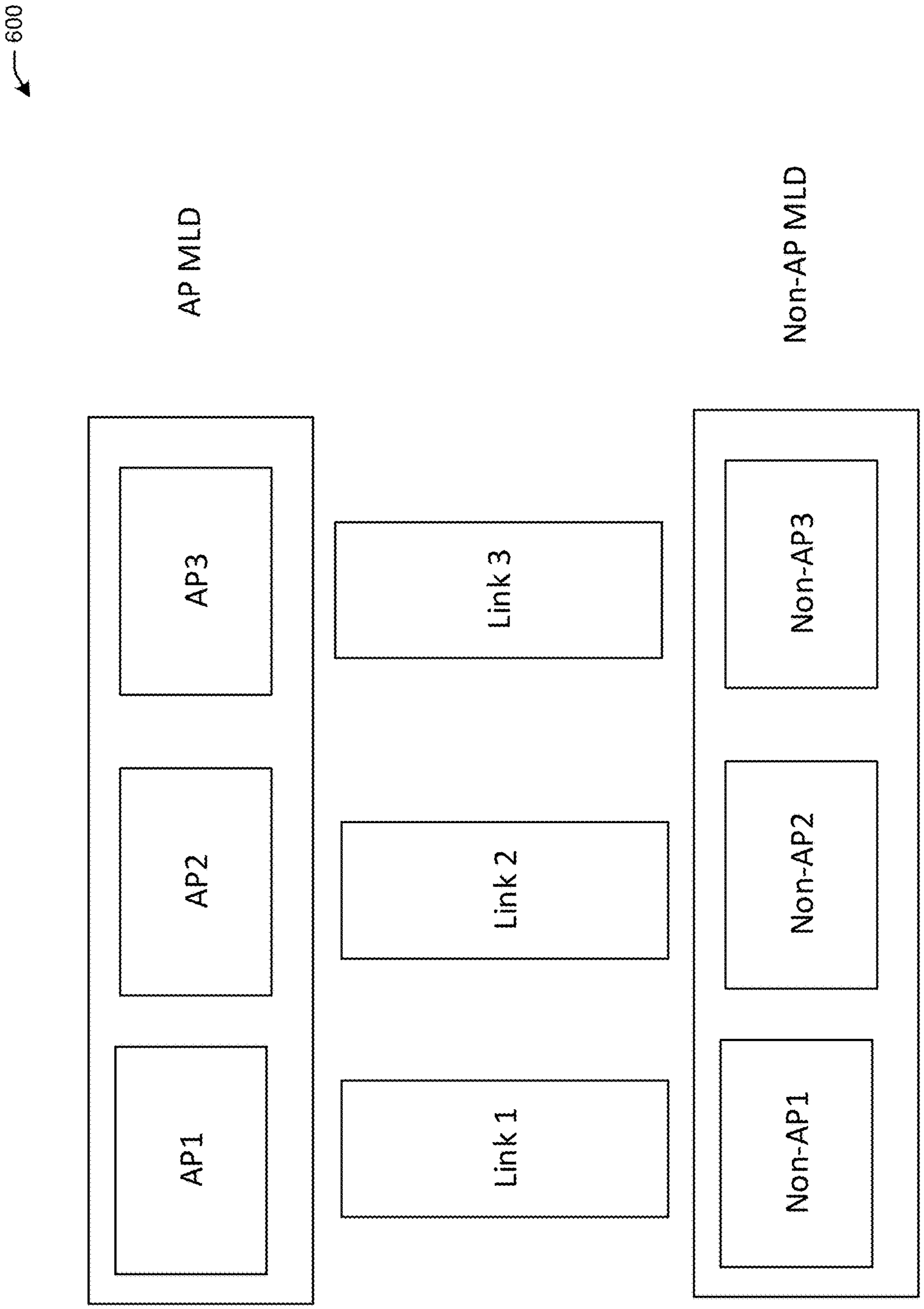
FIG. 6 illustrates MLD connections, in accordance with one or more example embodiments of the present disclosure.

FIG. 6 illustrates MLD connections 600, in accordance with one or more example embodiments of the present disclosure.

MLD is a logical entity that contains one or more STAs. The logical entity has one medium access control layer (MAC) data service interface and primitives to the logical link control (LLC) and a single address associated with the interface, which can be used to communicate on the distribution system medium (DSM). An MLD is a device that has more than one affiliated STA and has one MAC SAP to LLC, which includes one MAC data service. An AP MLD is an MLD in which each STA affiliated with the MLD is an AP. A non-AP MLD is an MLD in which each STA affiliated with the MLD is a non-AP STA.

Figure 8:
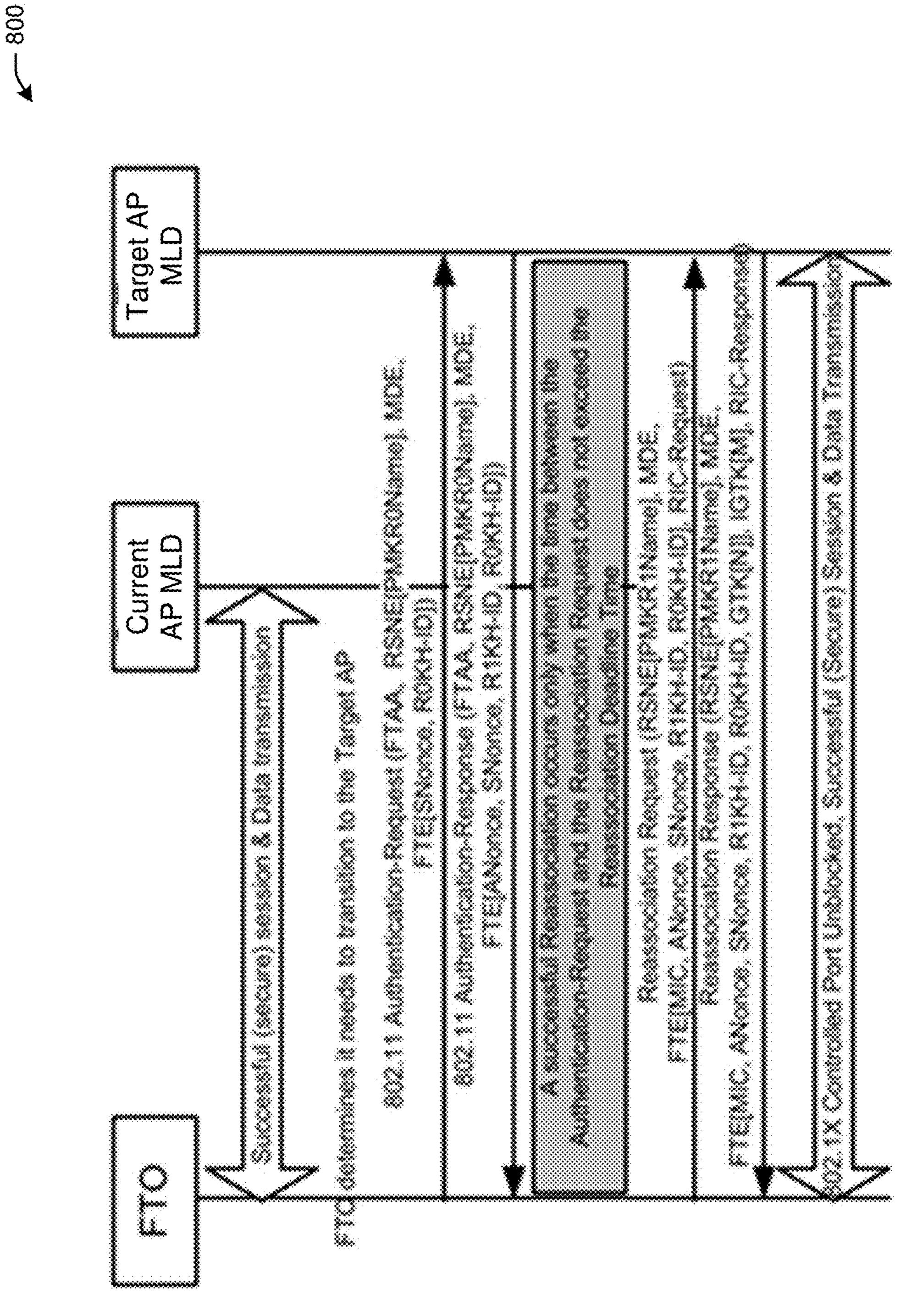
FIGS. 8-10 illustrate over-the-air FT protocols, in accordance with one or more example embodiments of the present disclosure.

An MLD has a MAC address that identifies the MLD management entity. An MLD allows STAs within the multi-link logical entity to have the same MAC address. An MLD allows multiple links to be established between an AP MLD and a non-AP MLD. The MAC address can be used in multi-link setup between a non-AP MLD and an AP MLD. As shown in FIG. 8, the AP MLD has affiliated APs and the non-AP MLD has affiliated non-AP STAs. Thus, multiple links can be set up so that the non-AP MLD can use any links afterwards. Note that compared with FT, when the non-AP MLD uses different links, FT sequence exchange can be avoided. As a result, MLD functionality simplifies the FT procedure.

In one or more embodiments, multiple links can be setup so that non-AP MLD can use any links afterwards. Note that compared with FT, when non-AP MLD uses different links, there is no need to do any FT sequence exchange. As a result, MLD functionality simplifies the FT procedure to the minimum.

Definition of MLD is as follows:

Multi-link device (MLD): A device that has more than one affiliated STA and has one MAC SAP to LLC, which includes one MAC data service.

AP multi-link device (AP MLD): A MLD, where each STA affiliated with the MLD is an AP.

Non-AP multi-link device (non-AP MLD): A MLD, where each STA affiliated with the MLD is a non-AP STA.

A MLD has a MAC address that identifies the MLD management entity.

For example, the MAC address can be used in multi-link setup between a non-AP MLD and an AP MLD.

MLD transition:

Existing association and reassociation is for moving among APs. The FT design for roaming among APs is described with the following scenarios:

From an AP MLD to another AP MLD.

From legacy AP to another AP MLD.

From an AP MLD to another legacy AP.

In one or more embodiments, a MLD resetup and transition may facilitate STA MAC address authentication in MLD. The STA MAC address of a MLD may need to be authenticated during 4-way handshake. The reason is that if those addresses are not authenticated, then fake STA addresses of a MLD (non-AP STA address of a non-AP MLD or AP MAC addresses) may be exchanged in multi-link setup.

A definition is presented based on the MLD SSID. In one or more embodiments, the APMLD in an ESS is defined as follows: an AP MLD is in one ESS if the SSID of the AP MLD is in the ESS. In one or more embodiments, an ESS may be the union of the infrastructure BSSs and MLDs with the same SSID connected by a DS. The STA MAC address authentication of an MLD is presented in FT 4-way handshake and over-the-air FT protocol for MLD.

It is understood that the above descriptions are for purposes of illustration and are not meant to be limiting.

Figure 7:
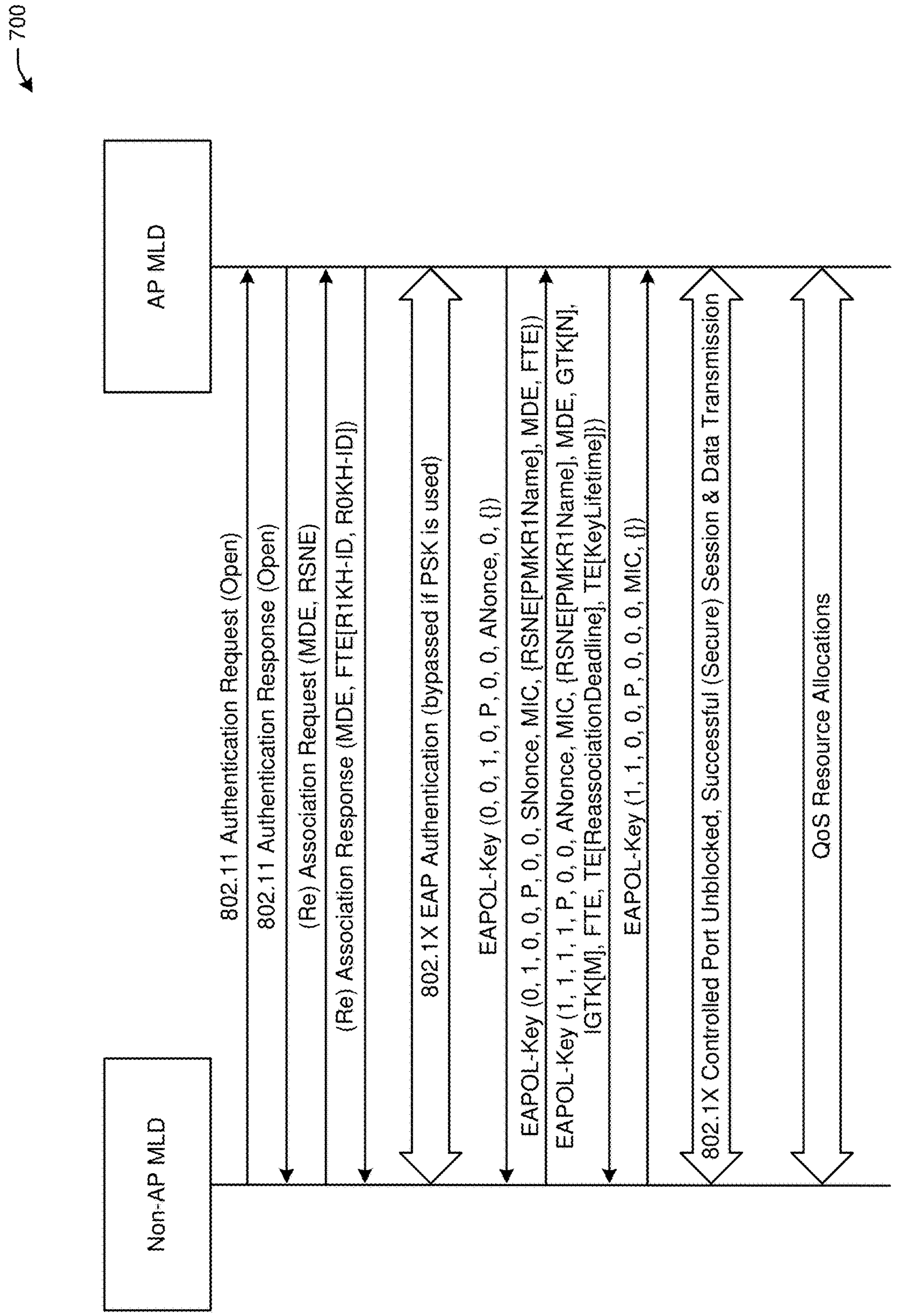
FIG. 7 illustrates an FT initial mobility domain MLD setup, in accordance with one or more example embodiments of the present disclosure.

FIG. 7 illustrates an FT initial mobility domain MLD setup 700, in accordance with one or more example embodiments of the present disclosure. FIG. 7 shows that initial domain figure is changed between a non-AP MLD and an AP MLD. As illustrated in FIG. 7, the operations occur between a non-AP MLD and an AP MLD instead of between a STA and an AP, as shown in FIG. 2.

In order to authenticate the MAC addresses of the non-AP STAs affiliated with the non-AP MLD and AP MAC addresses of the AP affiliated with the AP MLD, a MLD resetup and transition system may define STA MAC address key data encapsulation (KDE) as one of more repetition of Link ID plus MAC address fields as shown below.

| Link ID | MAC Address |
|---|---|

One or more of these fields

In one or more embodiments, a Non-AP MLD may carry STA MAC address KDE for different link in message 2 of FT 4-way handshake.

In one or more embodiments, an AP MLD may carry STA MAC address KDE for different link in message 3 of FT 4-way handshake.

Figure 9:
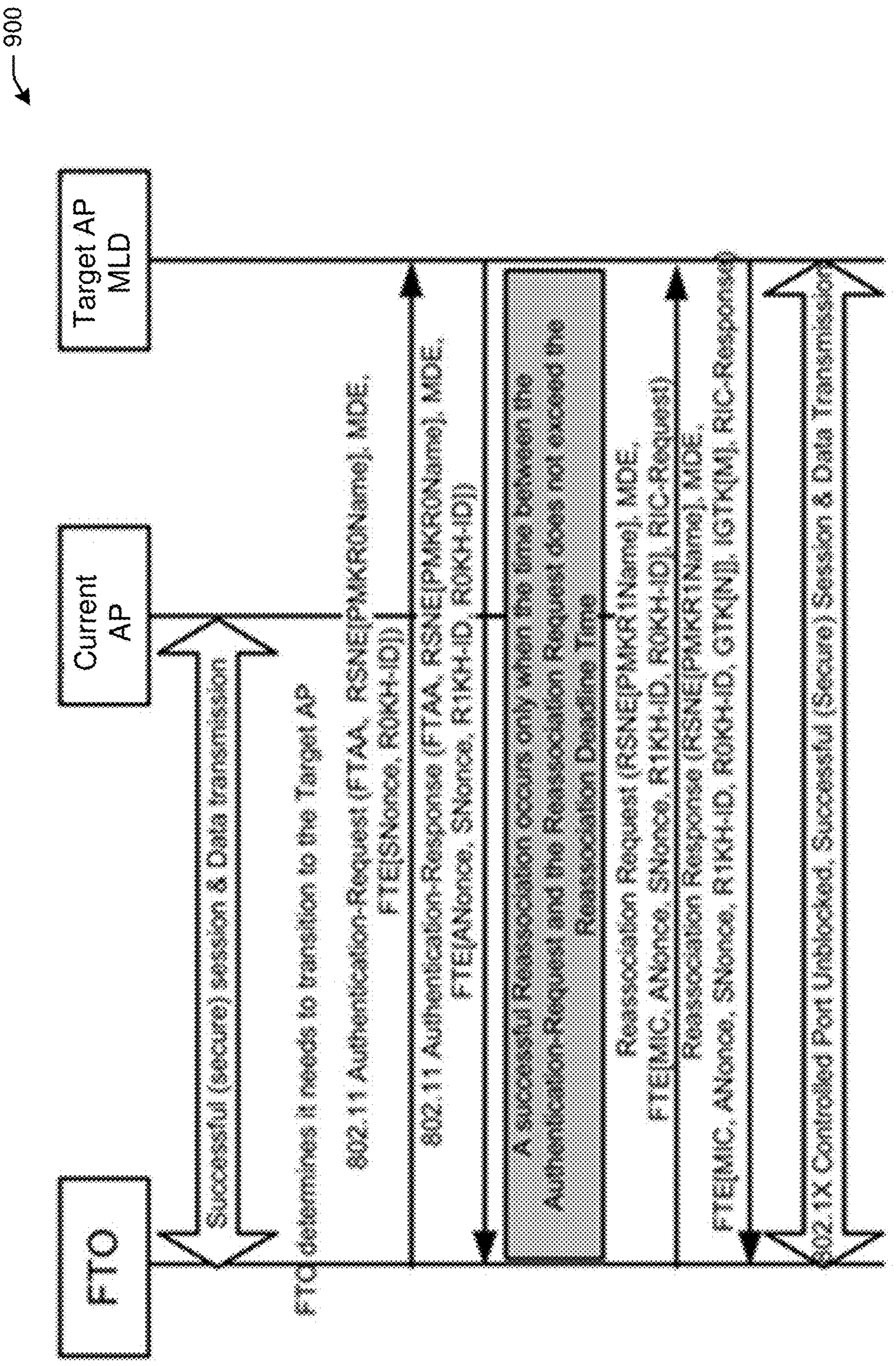
Figure 10:
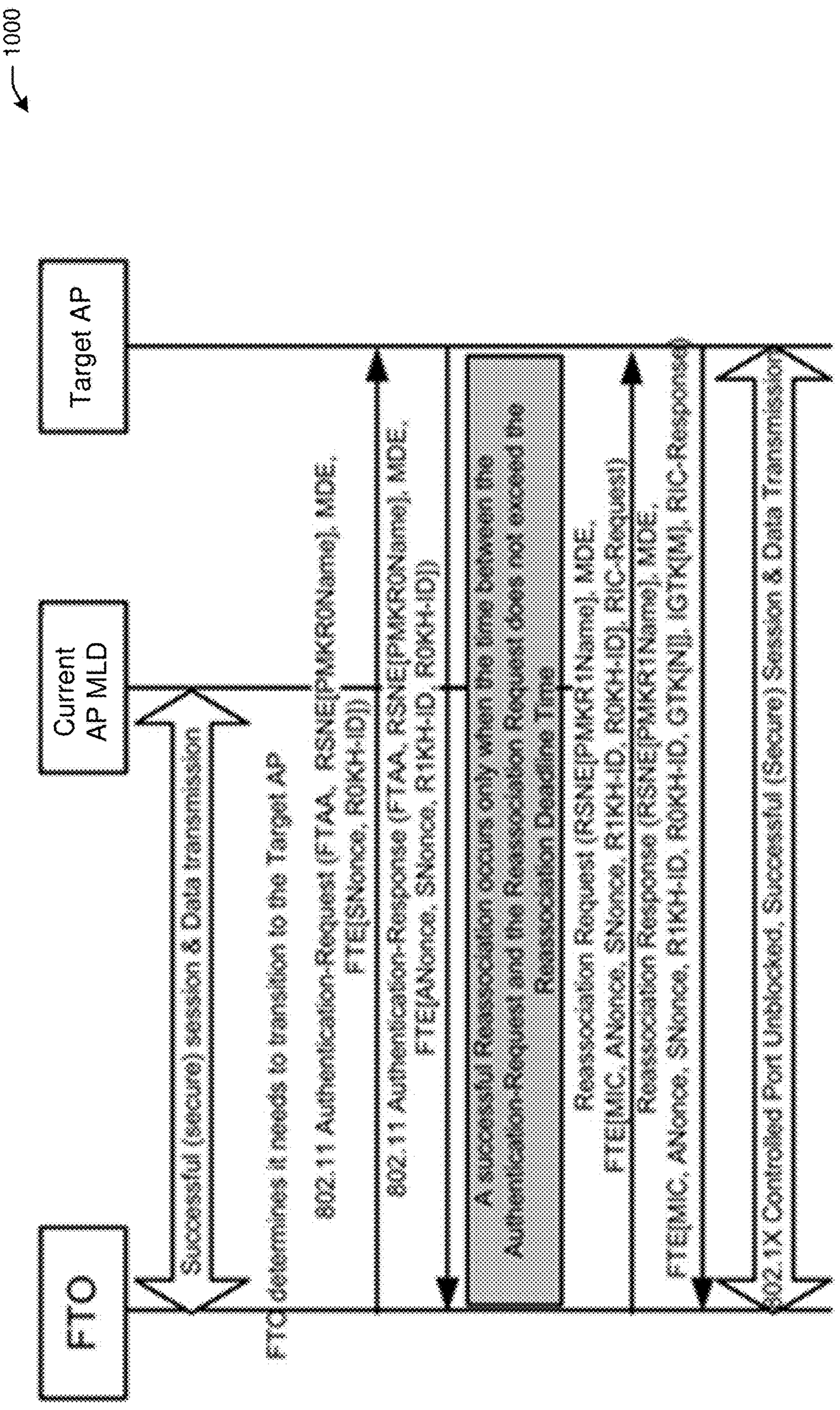

FIGS. 8-10 illustrate over-the-air FT protocols, in accordance with one or more example embodiments of the present disclosure. In particular, FIG. 8 illustrates OTA FT protocols 800 between a current AP MLD and a target AP MLD in accordance with some aspects; FIG. 9 illustrates OTA FT protocols 900 1000 between a current AP and a target AP MLD in accordance with some aspects; and FIG. 10 illustrates OTA FT protocols between a current AP MLD and a target AP in accordance with some aspects. In particular, the flow for roaming in an RSN includes the STA or FTO performing FT authentication to generate a PTK based on the PMK-R1 between the STA and the target AP. PMK-R1 is generated based on PMK-R0. The STA or FTO performs a reassociation request/response exchange with the target AP. GTK, IGTK, BIGTK are delivered by the target AP in the FTE carried in the reassociation response.

In one or more embodiments, the key holder design is as follows: the R0KH/R1KH/S0KH/S1KH key holder is allowed to be within the MLD, R0KH and R1KH are in the AP MLD, the S0KH and S1KH are in the non-AP MLD, R0KH is in the AP MLD if the initial domain operation is a multi-link (re)setup between the AP MLD and the non-AP MLD, S0KH is in the non-AP MLD if the initial domain operation is a multi-link (re)setup between the AP MLD and the non-AP MLD, R1KH is in the AP MLD if the initial domain operation is a multi-link (re)setup between the AP MLD and the non-AP MLD, and S1KH is in the non-AP MLD if the initial domain operation is a multi-link (re)setup between the AP MLD and the non-AP MLD.

In one or more embodiments, the key computation is as follows: if S0KH is in the non-AP MLD, then S0KH-ID is the non-AP MLD MAC address; if S1KH is in the non-AP MLD, then S1KH-ID is the non-AP MLD MAC address; if R1KH is in the AP MLD, then R1KH-ID is the AP MLD MAC address. In this case, as above, AA may be adjusted to the AP MLD MAC address and SPA to may be adjusted to the non-AP MLD MAC address when PMKID is computed for PMK-R1 transmission between the AP MLD and the non-AP MLD. The BSSID may be changed to the AP MLD MAC address and the STA-ADDR may be changed to the non-AP MLD address when PTK and PTKName are computed between the AP MLD and the non-AP MLD. Based on above, similar computations of PMK-R0, PMK-R0Name, PMK-R1, PMKR1Name, PMKID, PTK, PTKName may be used. The current calculation formula is shown below.

RO-Key-Data=KDF-Hash-Length(1Key, "FT-R0", SSIDlength||SSID||MDID||R0KH-length||R0KH-ID||S0KH-ID).

PMK-R0=L(RO-Key-Data, 0, Q).

PMK-R0Name-Salt=L(RO-Key-Data, Q, 128).

Length=Q+128.

S0KH-ID is the supplicant's MAC address (SPA).

PMKR0Name=Truncate−128(Hash("FT-R0N"||PMK-R0Name-Salt).

PMK-R1=KDF-Hash-Length(PMK-R0, "FT-R1", R1KH-ID||S1KH-ID).

R1KH-ID is a MAC address of the holder of the PMK-R1 in the Authenticator of the AP S1KH-ID is the SPA.

PMKR1Name=Truncate−128(Hash("FT-R1N"||PMK-R0Name||R1KH-ID||S1KH-ID).

PMKID=Truncate−128(HMAC-SHA-256(MPMK, "PMK Name"||AA||SPA).

PTK=KDF-Hash-Length(PMK-R1, "FT-PTK", SNonce||ANonce||BSSID||STA ADDR) where.

PTKName=Truncate−128(SHA-256(PMKR1Name||"FT-PTKN"||SNonce||ANonce||BSSID||STA-ADDR).

Thus, in RO-Key-Data: S0KH-ID is the non-AP MLD address; in PMK-R1 and PMKR1Name: R1KH-ID is the AP MLD address, and S1KH-ID is the non-AP MLD address; in PMKID AA is the AP MLD address, and SPA is the non-AP MLD address; in PTKName: BSSID is the AP MLD address, and STA-ADDR is the non-AP MLD address.

In one or more embodiments, key delivery of GTK/IGTK/BIGTK is as follows: if initial domain operation is multi-link setup between an AP MLD and a non-AP MLD, then the FT 4-way handshake can deliver GTK/IGTK/BIGTK of different links. Multi-link GTK KDE, Multi-link IGTK KDE, Multi-link BIGTK KDE can be defined to be carried in a FT 4-way handshake. Multi-link GTK KDE has the same format as GTK KDE except that an additional link ID field is used. Multi-link IGTK KDE has the same format as IGTK KDE except that an additional link ID field is used. Multi-link BIGTK KDE has the same format as BIGTK KDE except that an additional link ID field is used. If over-the-air FT protocol is between the non-AP MLD as the FTO and the target AP MLD, then the FTE can deliver GTK/IGTK/BIGTK of different links in the reassociation response.

Based on the current format of the FTE, the multi-link GTK sub-element, the multi-link IGTK sub-element, and the multi-link BIGTK sub-element may be added. The multi-link specific sub-element has the same format as the current sub-element, and the link ID may be added to determine the link for which the key will be applied.

To authenticate the MAC addresses of the non-AP STAs affiliated with the non-AP MLD, which is FTO, and AP MAC addresses of the AP affiliated with the target AP MLD. Define STA MAC address subelement as shown below:

| Subelement ID | Length | Link ID | MAC Address |
|---|---|---|---|

One or more of these fields

FTO put STA MAC address subelement in FTE of reassociation request.

Target AP MLD put STA MAC address subelement in FTE of reassociation response.

STA MAC address subelement can be put in FTE of FT 4-way handshake.

If over-the-air FT protocol is between non-AP MLD as FTO and Target AP MLD, then the FTE in reassociation response can deliver GTK/IGTK/BIGTK of different links.

Based on the current format of FTE, we add multi-link GTK subelement, multi-link IGTK subelement, multi-link BIGTK subelement. The multi-link specific subelement has the same format as the current subelement, except that the link ID may be added to determine the link that the key will be applied. A key may be added of different links together in one subelement.

Example of Multi-Link BIGTK Subelement:

| Subelement ID | Length | Link ID | Key ID | BIPN | Key Length | Wrapped Key |
|---|---|---|---|---|---|---|

One or more of these fields

Example of Multi-Link IGTK Subelement:

| Subelement ID | Length | Link ID | Key ID | IPN | Key Length | Wrapped Key |
|---|---|---|---|---|---|---|

One or more of these fields

Example of Multi-Link GTK Subelement:

| Subelement ID | Length | Link ID | Key Info | Key Length | RSC | Wrapped Key |
|---|---|---|---|---|---|---|

One or more of these fields

Example of FTE Format:

| | Element ID | Length | MIC Control | MIC | ANonce | SNonce | Optional Parameter(s) |
|---|---|---|---|---|---|---|---|
| Octets: | 1 | 1 | 2 | variable | 32 | 32 | variable |

Example of Optional Parameters Field Format:

| | Subelement ID | Length | Date |
|---|---|---|---|
| Octets: | 1 | 1 | variable |

Example of GTK Subelement Format:

| | Subelement ID | Length | Key Info | Key Length | RSC | Wrapped Key |
|---|---|---|---|---|---|---|
| Octets: | 1 | 1 | 2 | 1 | 8 | 24-40 |

Example of BIGTK Subelement Format:

| | Subelement ID | Length | Key ID | BIPN | Key Length | Wrapped Key |
|---|---|---|---|---|---|---|
| Octets: | 1 | 1 | 2 | 6 | 1 | 24-40 |

FIG. 9-363—BIGTK subelement format (#2116)

Table 1, below, shows the sub-element IDs for different values.

TABLE 1

Sub-element IDs

| Value | Data Field Contents |
|---|---|
| 0 | Reserved |
| 1 | PMK-R1 key holder identifier (R1KH-ID) |
| 2 | GTK |
| 3 | PMK-R0 key holder identifier (R0KH-ID) |
| 4 | IGTK |
| 5 | Operating Channel Information (OCI) |
| 6 | BIGTK |
| 7-255 | Reserved |

Figure 11:
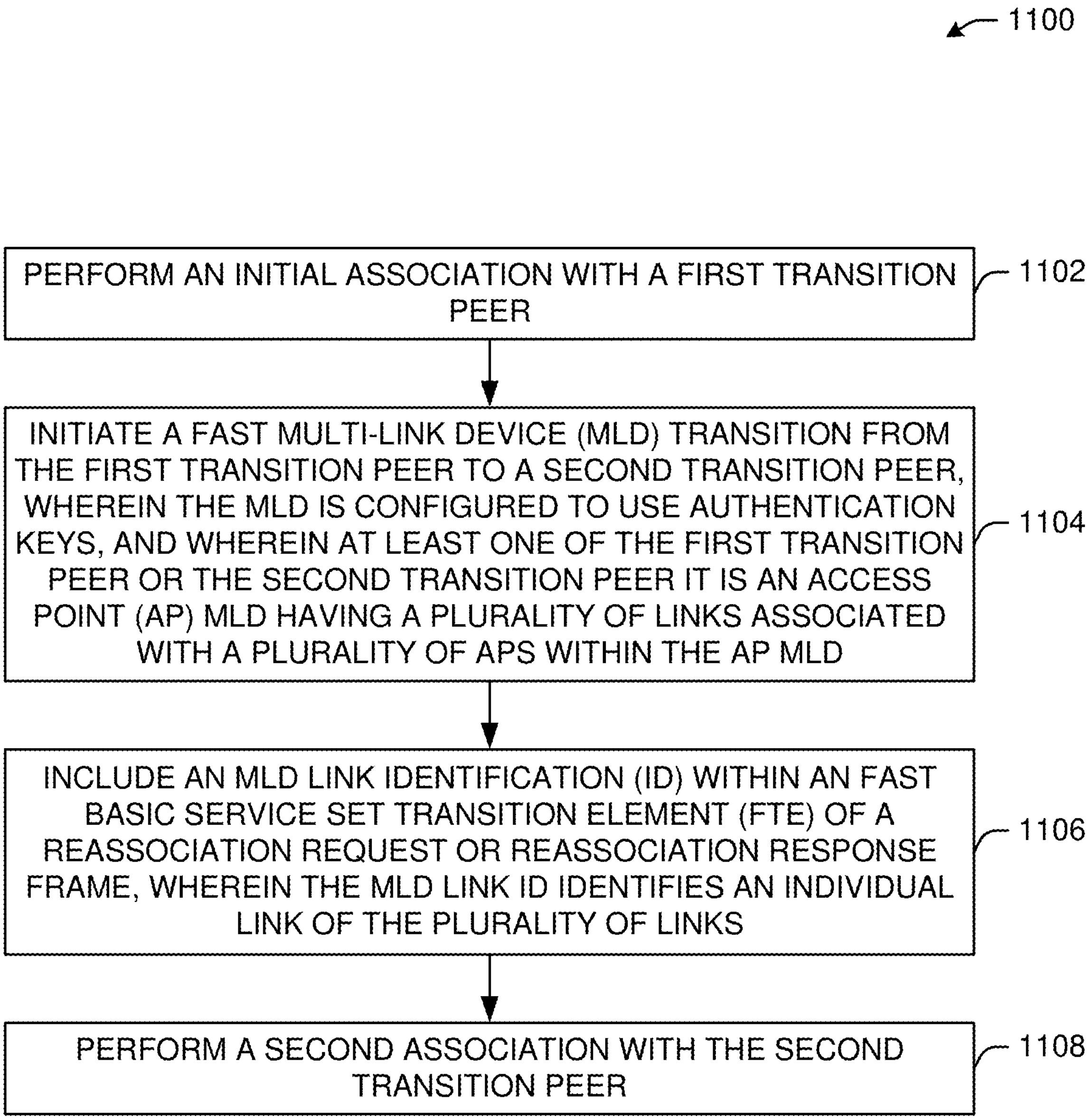
FIG. 11 illustrates a flow diagram of a process for an illustrative MLD device resetup and transition system, in accordance with one or more example embodiments of the present disclosure.

FIG. 11 illustrates a flow diagram of illustrative process 1100 for a MLD device resetup and transition system, in accordance with one or more example embodiments of the present disclosure.

At block 1102, a device (e.g., the user device(s) 120 and/or the AP 102 of FIG. 1) may perform an initial association with a first transition peer. The device may be a fast basic service set transition originator (FTO). The initial association comprises exchanging a multi-link element in a reassociation request or a reassociation response frame when the device is a non-access point (AP) MLD and the first transition peer is an AP multi-link device (MLD). The initial association comprises exchanging a key data encapsulation (KDE) in message 2 and message 3 of a fast basic service set transition (FT) 4-way handshake when the device is a non-access point (AP) MLD and the first transition peer is an AP multi-link device (MLD) and wherein the KDE comprises one link ID associated with a link of the AP MLD plus STA MAC address fields for the link.

At block 1104, the device may initiate a fast multi-link device (MLD) transition from the first transition peer to a second transition peer, wherein the MLD is configured to use authentication keys, and wherein at least one of the first transition peer or the second transition peer it is an access point (AP) MLD having a plurality of links associated with a plurality of APs within the AP MLD. The device may determine the device is a non-AP MLD and the first transition peer is an AP MLD, wherein the initial association comprises receiving a first group temporal key (GTK), a first integrity group temporal key (IGTK), or a first beacon integrity group transient key (BIGTK) associated with a first link between the non-AP MLD and the first transition peer in message 3 of fast basic service set transition (FT) 4-way handshake. The device may receive a second GTK, a second IGTK, or a second BIGTK associated with a second link between the non-AP MLD and the first transition peer in message 3 of fast basic service set transition (FT) 4-way handshake. A multi-link GTK KDE, a multi-link IGTK KDE, or a multi-link BIGTK KDE in message 3 of a fast basic service set transition (FT) 4-way handshake each comprises one link ID associated with a link of the AP MLD plus the first GTK, the first IGTK, or the first BIGTK. The device may determine the device is a non-AP MLD and the second transition peer is in AP MLD. The device may receive a first group temporal key (GTK), a first integrity group temporal key (IGTK), or a first beacon integrity group transient key (BIGTK) associated with a first link between the non-AP MLD and the second transition peer in reassociation response. The device may receive a second GTK, a second IGTK, or a second BIGTK associated with a second link between the non-AP MLD and the second transition peer in reassociation response. A multi-link GTK subelement of FTE, a multi-link IGTK subelement of FTE, or multi-link BIGTK subelement of FTE each comprises with one link ID associated with a link of the AP MLD plus the first GTK, first IGTK, or the first BIGTK.

At block 1106, the device may include an MLD link identification (ID) within a fast basic service set transition element (FTE) of a reassociation request or reassociation response frame, wherein the MLD link ID identifies an individual link of the plurality of links. The FTE may comprise a multi-link subelement, wherein the subelement comprises one link ID associated with a link of the AP MLD plus station device (STA) medium access control (MAC) address fields.

At block 1108, the device may perform a second association with the second transition peer. It is understood that the above descriptions are for purposes of illustration and are not meant to be limiting. FIG. 12 shows a functional diagram of an exemplary communication station 1200, in accordance with one or more example embodiments of the present disclosure. In one embodiment, FIG. 12 illustrates a functional block diagram of a communication station that may be suitable for use as an AP 102 (FIG. 1) or a user device 120 (FIG. 1) in accordance with some embodiments. The communication station 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1200 may include communications circuitry 1202 and a transceiver 1210 for transmitting and receiving signals to and from other communication stations using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication station 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication station 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication station 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1200 may include one or more of a keyboard, a display, a non-volatile memory port, multiple antennas, a graphics processor, an application processor, speakers, and other mobile device elements. The display may be an LCD screen including a touch screen.

Although the communication station 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1200 may include one or more processors and may be configured with instructions stored on a computer-readable storage device.

FIG. 13 illustrates a block diagram of an example of a machine 1300 or system upon which any one or more of the techniques (e.g., methodologies) discussed herein may be performed. In other embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a power management device 1332, a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (i.e., drive unit) 1316, a signal generation device 1318 (e.g., a speaker), a MLD device resetup and transition device 1319, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1302 for generation and processing of the baseband signals and for controlling operations of the main memory 1304, the storage device 1316, and/or the MLD device resetup and transition device 1319. The baseband processor may be provided on a single radio card, a single chip, or an integrated circuit (IC).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

The MLD device resetup and transition device 1319 may carry out or perform any of the operations and processes (e.g., process 1100) described and shown above.

It is understood that the above are only a subset of what the MLD device resetup and transition device 1319 may be configured to perform and that other functions included throughout this disclosure may also be performed by the MLD device resetup and transition device 1319.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 14:
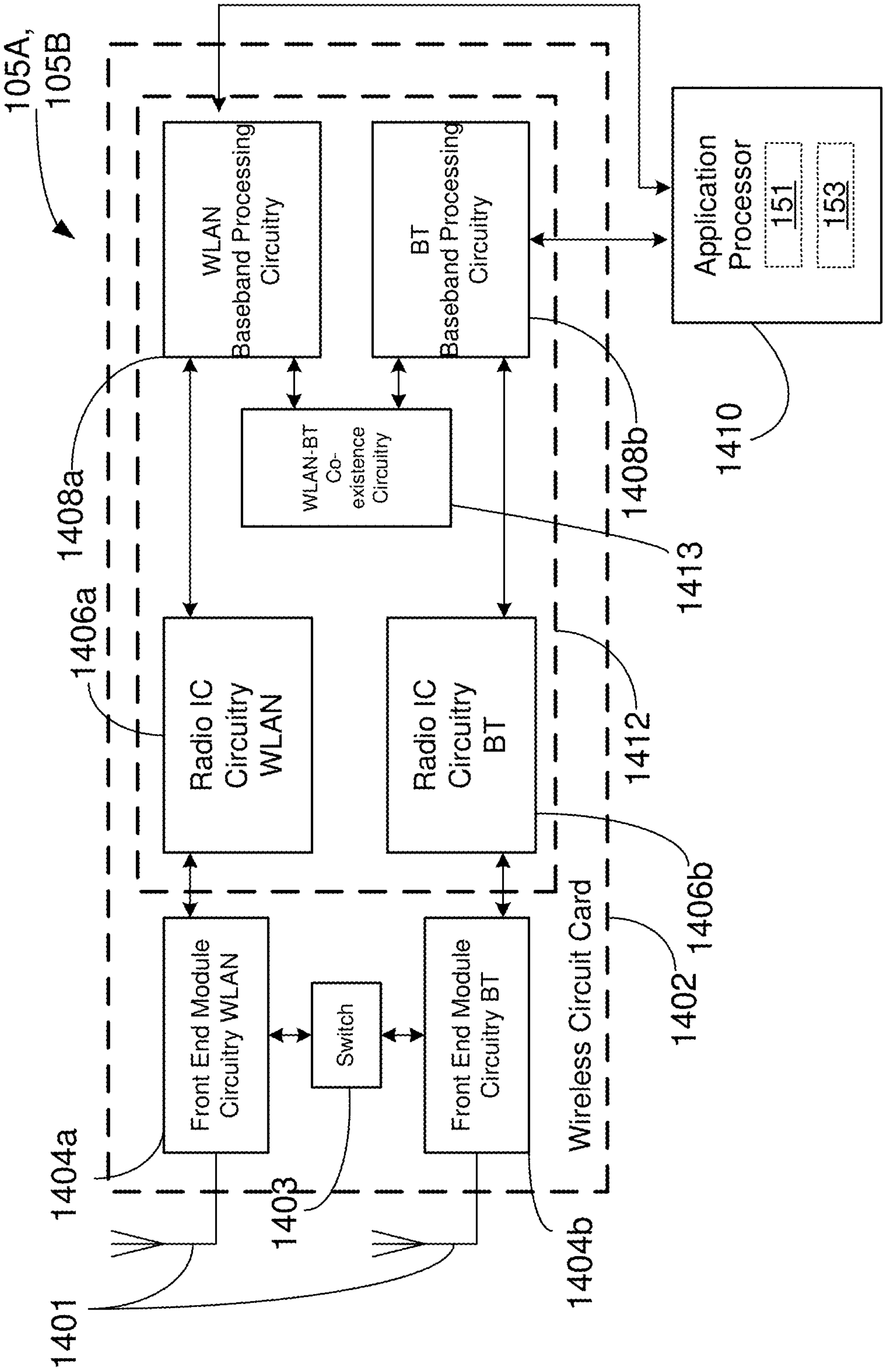
FIG. 14 is a block diagram of a radio architecture in accordance with some examples.

FIG. 14 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 1404*a-b*, radio IC circuitry 1406*a-b* and baseband processing circuitry 1408*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1404*a-b* may include a WLAN or Wi-Fi FEM circuitry 1404*a* and a Bluetooth (BT) FEM circuitry 1404*b*. The WLAN FEM circuitry 1404*a* may include a receive signal path comprising circuitry configured to operate on WLAN RF signals received from one or more antennas 1401, to amplify the received signals and to provide the amplified versions of the received signals to the WLAN radio IC circuitry 1406*a* for further processing. The BT FEM circuitry 1404*b* may include a receive signal path which may include circuitry configured to operate on BT RF signals received from one or more antennas 1401, to amplify the received signals and to provide the amplified versions of the received signals to the BT radio IC circuitry 1406*b* for further processing. FEM circuitry 1404*a* may also include a transmit signal path which may include circuitry configured to amplify WLAN signals provided by the radio IC circuitry 1406*a* for wireless transmission by one or more of the antennas 1401. In addition, FEM circuitry 1404*b* may also include a transmit signal path which may include circuitry configured to amplify BT signals provided by the radio IC circuitry 1406*b* for wireless transmission by the one or more antennas. In the embodiment of FIG. 14, although FEM 1404*a* and FEM 1404*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1406*a-b* as shown may include WLAN radio IC circuitry 1406*a* and BT radio IC circuitry 1406*b*. The WLAN radio IC circuitry 1406*a* may include a receive signal path which may include circuitry to down-convert WLAN RF signals received from the FEM circuitry 1404*a* and provide baseband signals to WLAN baseband processing circuitry 1408*a*. BT radio IC circuitry 1406*b* may in turn include a receive signal path which may include circuitry to down-convert BT RF signals received from the FEM circuitry 1404*b* and provide baseband signals to BT baseband processing circuitry 1408*b*. WLAN radio IC circuitry 1406*a* may also include a transmit signal path which may include circuitry to up-convert WLAN baseband signals provided by the WLAN baseband processing circuitry 1408*a* and provide WLAN RF output signals to the FEM circuitry 1404*a* for subsequent wireless transmission by the one or more antennas 1401. BT radio IC circuitry 1406*b* may also include a transmit signal path which may include circuitry to up-convert BT baseband signals provided by the BT baseband processing circuitry 1408*b* and provide BT RF output signals to the FEM circuitry 1404*b* for subsequent wireless transmission by the one or more antennas 1401. In the embodiment of FIG. 14, although radio IC circuitries 1406*a* and 1406*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1408*a-b* may include a WLAN baseband processing circuitry 1408*a* and a BT baseband processing circuitry 1408*b*. The WLAN baseband processing circuitry 1408*a* may include a memory, such as, for example, a set of RAM arrays in a Fast Fourier Transform or Inverse Fast Fourier Transform block (not shown) of the WLAN baseband processing circuitry 1408*a*. Each of the WLAN baseband circuitry 1408*a* and the BT baseband circuitry 1408*b* may further include one or more processors and control logic to process the signals received from the corresponding WLAN or BT receive signal path of the radio IC circuitry 1406*a-b*, and to also generate corresponding WLAN or BT baseband signals for the transmit signal path of the radio IC circuitry 1406*a-b*. Each of the baseband processing circuitries 1408*a* and 1408*b* may further include physical layer (PHY) and medium access control layer (MAC) circuitry, and may further interface with a device for generation and processing of the baseband signals and for controlling operations of the radio IC circuitry 1406*a-b*.

Referring still to FIG. 14, according to the shown embodiment, WLAN-BT coexistence circuitry 1413 may include logic providing an interface between the WLAN baseband circuitry 1408*a* and the BT baseband circuitry 1408*b* to enable use cases requiring WLAN and BT coexistence. In addition, a switch 1403 may be provided between the WLAN FEM circuitry 1404*a* and the BT FEM circuitry 1404*b* to allow switching between the WLAN and BT radios according to application needs. In addition, although the antennas 1401 are depicted as being respectively connected to the WLAN FEM circuitry 1404*a* and the BT FEM circuitry 1404*b*, embodiments include within their scope the sharing of one or more antennas as between the WLAN and BT FEMs, or the provision of more than one antenna connected to each of FEM 1404*a* or 1404*b*.

In some embodiments, the front-end module circuitry 1404*a-b*, the radio IC circuitry 1406*a-b*, and baseband processing circuitry 1408*a-b* may be provided on a single radio card, such as wireless radio card 1402. In some other embodiments, the one or more antennas 1401, the FEM circuitry 1404*a-b* and the radio IC circuitry 1406*a-b* may be provided on a single radio card. In some other embodiments, the radio IC circuitry 1406*a-b* and the baseband processing circuitry 1408*a-b* may be provided on a single chip or integrated circuit (IC), such as IC 1412.

In some embodiments, the wireless radio card 1402 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1408*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 15:
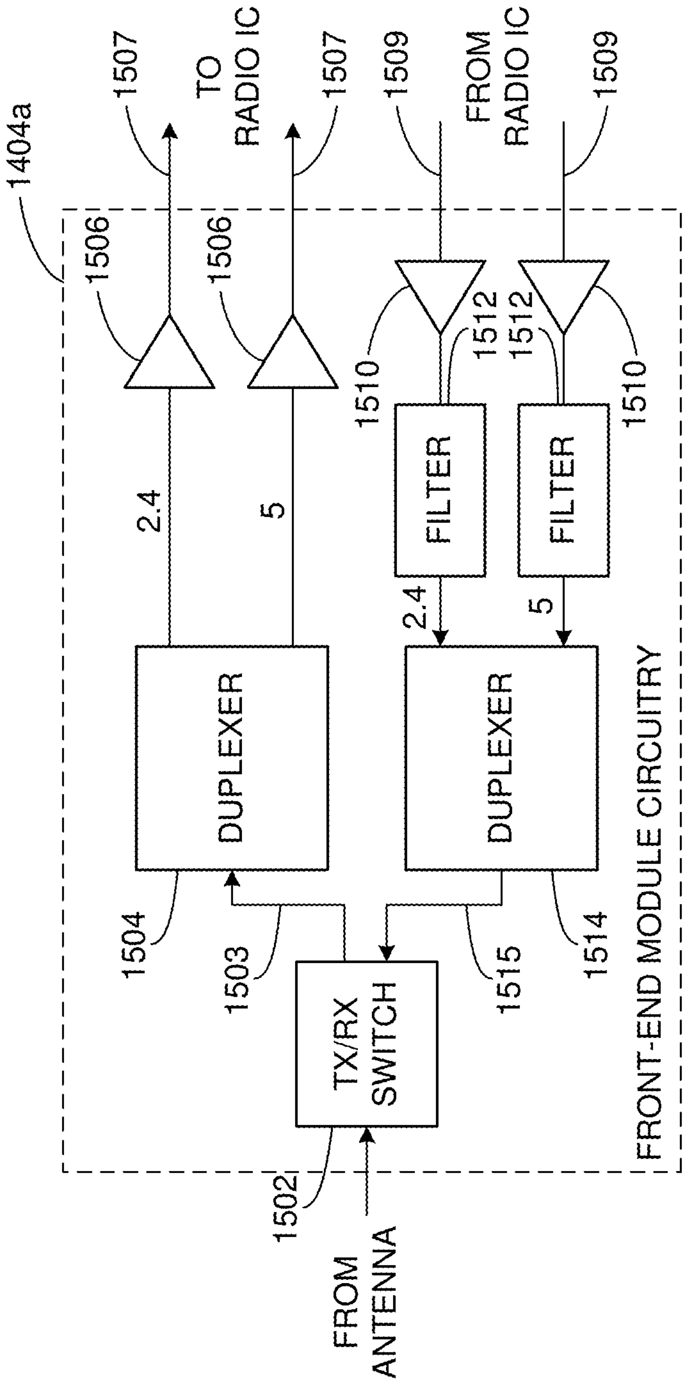
FIG. 15 illustrates an example front-end module circuitry for use in the radio architecture of FIG. 14, in accordance with one or more example embodiments of the present disclosure.

FIG. 15 illustrates WLAN FEM circuitry 1404*a* in accordance with some embodiments. Although the example of FIG. 15 is described in conjunction with the WLAN FEM circuitry 1404*a*, the example of FIG. 15 may be described in conjunction with the example BT FEM circuitry 1404*b* (FIG. 14), although other circuitry configurations may also be suitable.

In some embodiments, the FEM circuitry 1404*a* may include a TX/RX switch 1502 to switch between transmit mode and receive mode operation. The FEM circuitry 1404*a* may include a receive signal path and a transmit signal path.

The receive signal path of the FEM circuitry 1404*a* may include a low-noise amplifier (LNA) 1506 to amplify received RF signals 1503 and provide the amplified received RF signals 1507 as an output (e.g., to the radio IC circuitry 1406*a-b* (FIG. 14)). The transmit signal path of the circuitry 1404*a* may include a power amplifier (PA) to amplify input RF signals 1509 (e.g., provided by the radio IC circuitry 1406*a-b*), and one or more filters 1512, such as band-pass filters (BPFs), low-pass filters (LPFs) or other types of filters, to generate RF signals 1515 for subsequent transmission (e.g., by one or more of the antennas 1401 (FIG. 14)) via an example duplexer 1514.

In some dual-mode embodiments for Wi-Fi communication, the FEM circuitry 1404*a* may be configured to operate in either the 2.4 GHz frequency spectrum or the 5 GHz frequency spectrum. In these embodiments, the receive signal path of the FEM circuitry 1404*a* may include a receive signal path duplexer 1504 to separate the signals from each spectrum as well as provide a separate LNA 1506 for each spectrum as shown. In these embodiments, the transmit signal path of the FEM circuitry 1404*a* may also include a power amplifier 1510 and a filter 1512, such as a BPF, an LPF or another type of filter for each frequency spectrum and a transmit signal path duplexer 1504 to provide the signals of one of the different spectrums onto a single transmit path for subsequent transmission by the one or more of the antennas 1401 (FIG. 14). In some embodiments, BT communications may utilize the 2.4 GHz signal paths and may utilize the same FEM circuitry 1404*a* as the one used for WLAN communications.

Figure 16:
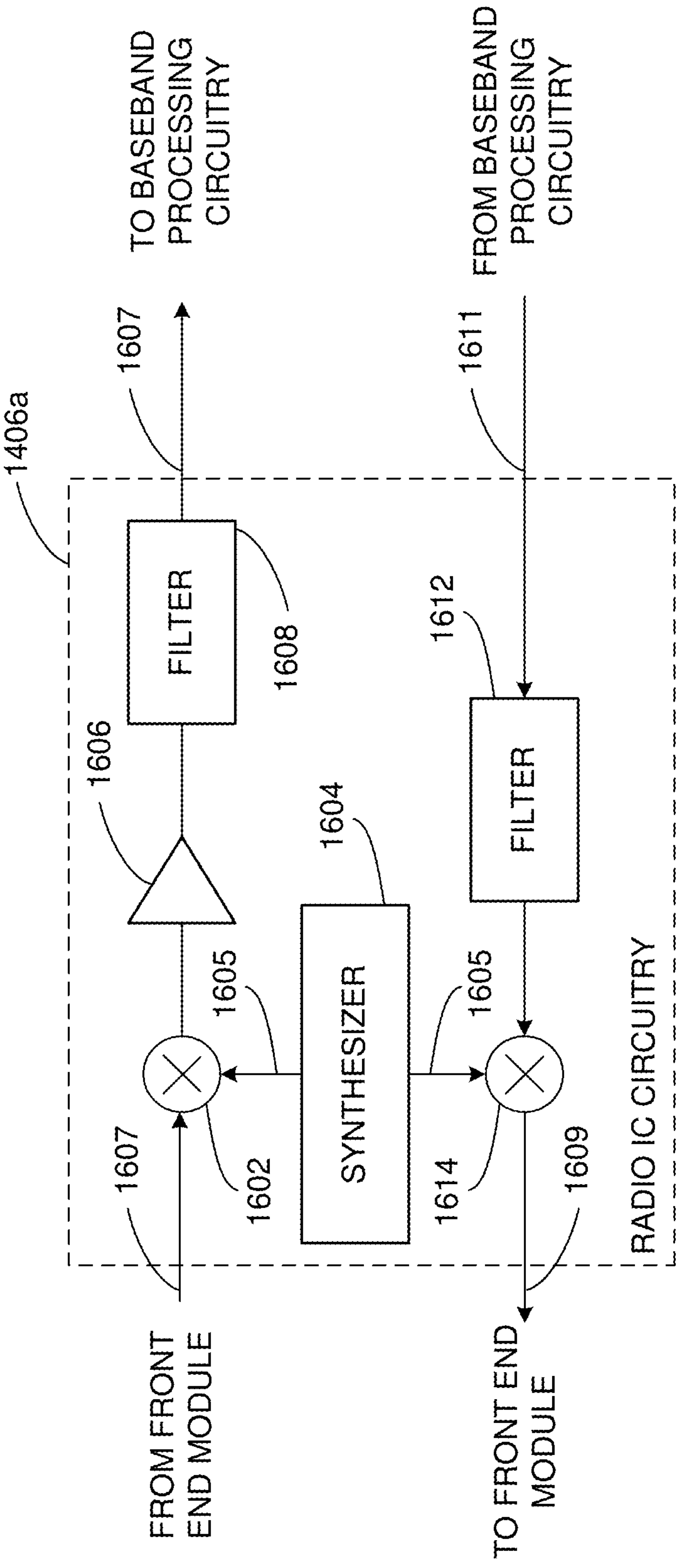
FIG. 16 illustrates an example radio IC circuitry for use in the radio architecture of FIG. 14, in accordance with one or more example embodiments of the present disclosure.

FIG. 16 illustrates radio IC circuitry 1406*a* in accordance with some embodiments. The radio IC circuitry 1406*a* is one example of circuitry that may be suitable for use as the WLAN or BT radio IC circuitry 1406*a*/1406*b* (FIG. 14), although other circuitry configurations may also be suitable. Alternatively, the example of FIG. 16 may be described in conjunction with the example BT radio IC circuitry 1406*b*.

In some embodiments, the radio IC circuitry 1406*a* may include a receive signal path and a transmit signal path. The receive signal path of the radio IC circuitry 1406*a* may include at least mixer circuitry 1602, such as, for example, down-conversion mixer circuitry, amplifier circuitry 1606 and filter circuitry 1608. The transmit signal path of the radio IC circuitry 1406*a* may include at least filter circuitry 1612 and mixer circuitry 1614, such as, for example, up-conversion mixer circuitry. Radio IC circuitry 1406*a* may also include synthesizer circuitry 1604 for synthesizing a frequency 1605 for use by the mixer circuitry 1602 and the mixer circuitry 1614. The mixer circuitry 1602 and/or 1614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 16 illustrates only a simplified version of a radio IC circuitry, and may include, although not shown, embodiments where each of the depicted circuitries may include more than one component. For instance, mixer circuitry 1614 may each include one or more mixers, and filter circuitries 1608 and/or 1612 may each include one or more filters, such as one or more BPFs and/or LPFs according to application needs. For example, when mixer circuitries are of the direct-conversion type, they may each include two or more mixers.

In some embodiments, mixer circuitry 1602 may be configured to down-convert RF signals 1507 received from the FEM circuitry 1404*a-b* (FIG. 14) based on the synthesized frequency 1605 provided by synthesizer circuitry 1604. The amplifier circuitry 1606 may be configured to amplify the down-converted signals and the filter circuitry 1608 may include an LPF configured to remove unwanted signals from the down-converted signals to generate output baseband signals 1607. Output baseband signals 1607 may be provided to the baseband processing circuitry 1408*a-b* (FIG. 14) for further processing. In some embodiments, the output baseband signals 1607 may be zero-frequency baseband signals, although this is not a requirement. In some embodiments, mixer circuitry 1602 may comprise passive mixers, although the scope of the embodiments is not limited in this respect.

In some embodiments, the mixer circuitry 1614 may be configured to up-convert input baseband signals 1611 based on the synthesized frequency 1605 provided by the synthesizer circuitry 1604 to generate RF output signals 1509 for the FEM circuitry 1404*a-b*. The baseband signals 1611 may be provided by the baseband processing circuitry 1408*a-b* and may be filtered by filter circuitry 1612. The filter circuitry 1612 may include an LPF or a BPF, although the scope of the embodiments is not limited in this respect.

In some embodiments, the mixer circuitry 1602 and the mixer circuitry 1614 may each include two or more mixers and may be arranged for quadrature down-conversion and/or up-conversion respectively with the help of synthesizer 1604. In some embodiments, the mixer circuitry 1602 and the mixer circuitry 1614 may each include two or more mixers each configured for image rejection (e.g., Hartley image rejection). In some embodiments, the mixer circuitry 1602 and the mixer circuitry 1614 may be arranged for direct down-conversion and/or direct up-conversion, respectively. In some embodiments, the mixer circuitry 1602 and the mixer circuitry 1614 may be configured for super-heterodyne operation, although this is not a requirement.

Mixer circuitry 1602 may comprise, according to one embodiment: quadrature passive mixers (e.g., for the in-phase (I) and quadrature phase (Q) paths). In such an embodiment, RF input signal 1507 from FIG. 16 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1605 of synthesizer 1604 (FIG. 16). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1507 (FIG. 15) may comprise a balanced signal, although the scope of the embodiments is not limited in this respect. The I and Q baseband output signals may be provided to low-noise amplifier, such as amplifier circuitry 1606 (FIG. 16) or to filter circuitry 1608 (FIG. 16).

In some embodiments, the output baseband signals 1607 and the input baseband signals 1611 may be analog baseband signals, although the scope of the embodiments is not limited in this respect. In some alternate embodiments, the output baseband signals 1607 and the input baseband signals 1611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1604 may be a fractional-N synthesizer or a fractional N/N+1 synthesizer, although the scope of the embodiments is not limited in this respect as other types of frequency synthesizers may be suitable. For example, synthesizer circuitry 1604 may be a delta-sigma synthesizer, a frequency multiplier, or a synthesizer comprising a phase-locked loop with a frequency divider. According to some embodiments, the synthesizer circuitry 1604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1604 may be provided by a voltage controlled oscillator (VCO), although that is not a requirement. A divider control input may further be provided by either the baseband processing circuitry 1408*a-b* (FIG. 14) depending on the desired output frequency 1605. In some embodiments, a divider control input (e.g., N) may be determined from a look-up table (e.g., within a Wi-Fi card) based on a channel number and a channel center frequency as determined or indicated by the example application processor 1410. The application processor 1410 may include, or otherwise be connected to, one of the example secure signal converter 101 or the example received signal converter 103 (e.g., depending on which device the example radio architecture is implemented in).

In some embodiments, synthesizer circuitry 1604 may be configured to generate a carrier frequency as the output frequency 1605, while in other embodiments, the output frequency 1605 may be a fraction of the carrier frequency (e.g., one-half the carrier frequency, one-third the carrier frequency). In some embodiments, the output frequency 1605 may be a LO frequency (fLO).

Figure 17:
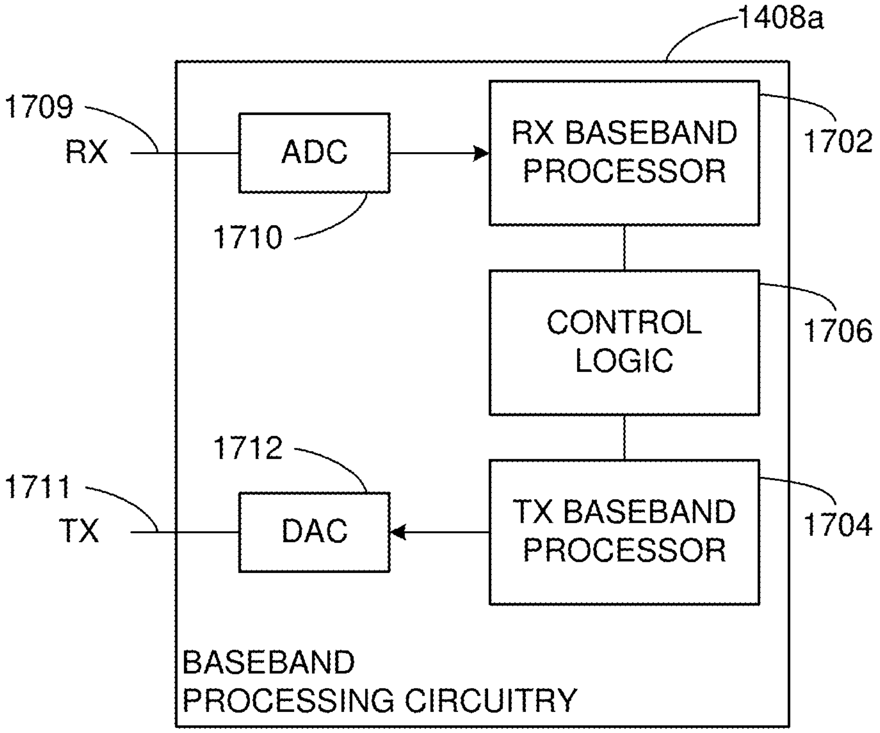
FIG. 17 illustrates an example baseband processing circuitry for use in the radio architecture of FIG. 14, in accordance with one or more example embodiments of the present disclosure.

FIG. 17 illustrates a functional block diagram of baseband processing circuitry 1408*a* in accordance with some embodiments. The baseband processing circuitry 1408*a* is one example of circuitry that may be suitable for use as the baseband processing circuitry 1408*a* (FIG. 14), although other circuitry configurations may also be suitable. Alternatively, the example of FIG. 16 may be used to implement the example BT baseband processing circuitry 1408*b* of FIG. 14.

The baseband processing circuitry 1408*a* may include a receive baseband processor (RX BBP) 1702 for processing receive baseband signals 1609 provided by the radio IC circuitry 1406*a-b* (FIG. 14) and a transmit baseband processor (TX BBP) 1704 for generating transmit baseband signals 1611 for the radio IC circuitry 1406*a-b*. The baseband processing circuitry 1408*a* may also include control logic 1706 for coordinating the operations of the baseband processing circuitry 1408*a*.

In some embodiments (e.g., when analog baseband signals are exchanged between the baseband processing circuitry 1408*a-b* and the radio IC circuitry 1406*a-b*), the baseband processing circuitry 1408*a* may include ADC 1710 to convert analog baseband signals 1709 received from the radio IC circuitry 1406*a-b* to digital baseband signals for processing by the RX BBP 1702. In these embodiments, the baseband processing circuitry 1408*a* may also include DAC 1712 to convert digital baseband signals from the TX BBP 1704 to analog baseband signals 1711.

In some embodiments that communicate OFDM signals or OFDMA signals, such as through baseband processor 1408*a*, the transmit baseband processor 1704 may be configured to generate OFDM or OFDMA signals as appropriate for transmission by performing an inverse fast Fourier transform (IFFT). The receive baseband processor 1702 may be configured to process received OFDM signals or OFDMA signals by performing an FFT. In some embodiments, the receive baseband processor 1702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 14, in some embodiments, the antennas 1401 (FIG. 14) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1401 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (CPRS), extended CPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: perform an initial association with a first transition peer; initiate a fast multi-link device (MLD) transition from the first transition peer to a second transition peer, wherein the MLD may be configured to use authentication keys, and wherein at least one of the first transition peer or the second transition peer it may be an access point (AP) MLD having a plurality of links associated with a plurality of APs within the AP MLD; include an MLD link identification (ID) within an fast basic service set transition element (FTE) of a reassociation request or reassociation response frame, wherein the MLD link ID identifies an individual link of the plurality of links; and perform a second association with the second transition peer.

Example 2 may include the device of example 1 and/or some other example herein, wherein the initial association comprises exchanging a multi-link element in a reassociation request or a reassociation response frame when the device may be a non-access point (AP) MLD and the first transition peer may be an AP multi-link device (MLD).

Example 3 may include the device of example 1 and/or some other example herein, wherein the initial association comprises exchanging a key data encapsulation (KDE) in message 2 and message 3 of a fast basic service set transition (FT) 4-way handshake when the device may be a non-access point (AP) MLD and the first transition peer may be an AP multi-link device (MLD) and wherein the KDE comprises one link ID associated with a link of the AP MLD plus STA MAC address fields for the link.

Example 4 may include the device of example 1 and/or some other example herein, wherein the processing circuitry may be further configured to: determine the device may be a non-AP MLD and the first transition peer may be an AP MLD, wherein the initial association comprises receiving a first group temporal key (GTK), a first integrity group temporal key (IGTK), or a first beacon integrity group transient key (BIGTK) associated with a first link between the non-AP MLD and the first transition peer in message 3 of fast basic service set transition (FT) 4-way handshake; and receive a second GTK, a second IGTK, or a second BIGTK associated with a second link between the non-AP MLD and the first transition peer in message 3 of fast basic service set transition (FT) 4-way handshake.

Example 5 may include the device of example 4 and/or some other example herein, wherein a multi-link GTK KDE, a multi-link IGTK KDE, or a multi-link BIGTK KDE in message 3 of a fast basic service set transition (FT) 4-way handshake each comprises one link ID associated with a link of the AP MLD plus the first GTK, the first IGTK, or the first BIGTK.

Example 6 may include the device of example 1 and/or some other example herein, wherein the device may be a fast basic service set transition originator (FTO).

Example 7 may include the device of example 1 and/or some other example herein, wherein the FTE comprises a multi-link subelement of an, wherein the subelement comprises one link ID associated with a link of the AP MLD plus station device (STA) medium access control (MAC) address fields.

Example 8 may include the device of example 1 and/or some other example herein, wherein the processing circuitry may be further configured to: determine the device may be a non-AP MLD and the second transition peer may be in AP MLD; receive a first group temporal key (GTK), a first integrity group temporal key (IGTK), or a first beacon integrity group transient key (BIGTK) associated with a first link between the non-AP MLD and the second transition peer in reassociation response; and receive a second GTK, a second IGTK, or a second BIGTK associated with a second link between the non-AP MLD and the second transition peer in reassociation response.

Example 9 may include the device of example 8 and/or some other example herein, wherein a multi-link GTK subelement of FTE, a multi-link IGTK subelement of FTE, or multi-link BIGTK subelement of FTE each comprises with one link ID associated with a link of the AP MLD plus the first GTK, first IGTK, or the first BIGTK.

Example 10 may include a non-transitory computer-readable medium storing computer-executable instructions which when executed by one or more processors result in performing operations comprising: performing an initial association with a first transition peer; initiating a fast multi-link device (MLD) transition from the first transition peer to a second transition peer, wherein the MLD may be configured to use authentication keys, and wherein at least one of the first transition peer or the second transition peer it may be an access point (AP) MLD having a plurality of links associated with a plurality of APs within the AP MLD; including an MLD link identification (ID) within an fast basic service set transition element (FTE) of a reassociation request or reassociation response frame, wherein the MLD link ID identifies an individual link of the plurality of links; and performing a second association with the second transition peer.

Example 11 may include the non-transitory computer-readable medium of example 10 and/or some other example herein, wherein the initial association comprises exchanging a multi-link element in a reassociation request or a reassociation response frame when the device may be a non-access point (AP) MLD and the first transition peer may be an AP multi-link device (MLD).

Example 12 may include the non-transitory computer-readable medium of example 10 and/or some other example herein, wherein the initial association comprises exchanging a key data encapsulation (KDE) in message 2 and message 3 of a fast basic service set transition (FT) 4-way handshake when the device may be a non-access point (AP) MLD and the first transition peer may be an AP multi-link device (MLD) and wherein the KDE comprises one link ID associated with a link of the AP MLD plus STA MAC address fields for the link.

Example 13 may include the non-transitory computer-readable medium of example 10 and/or some other example herein, wherein the operations further comprise: determining the device may be a non-AP MLD and the first transition peer may be an AP MLD, wherein the initial association comprises receiving a first group temporal key (GTK), a first integrity group temporal key (IGTK), or a first beacon integrity group transient key (BIGTK) associated with a first link between the non-AP MLD and the first transition peer in message 3 of fast basic service set transition (FT) 4-way handshake; and receiving a second GTK, a second IGTK, or a second BIGTK associated with a second link between the non-AP MLD and the first transition peer in message 3 of fast basic service set transition (FT) 4-way handshake.

Example 14 may include the non-transitory computer-readable medium of example 13 and/or some other example herein, wherein a multi-link GTK KDE, a multi-link IGTK KDE, or a multi-link BIGTK KDE in message 3 of a fast basic service set transition (FT) 4-way handshake each comprises one link ID associated with a link of the AP MLD plus the first GTK, the first IGTK, or the first BIGTK.

Example 15 may include the non-transitory computer-readable medium of example 10 and/or some other example herein, wherein the device may be a fast basic service set transition originator (FTO).

Example 16 may include the non-transitory computer-readable medium of example 10 and/or some other example herein, wherein the FTE comprises a multi-link subelement of an, wherein the subelement comprises one link ID associated with a link of the AP MLD plus station device (STA) medium access control (MAC) address fields.

Example 17 may include the non-transitory computer-readable medium of example 10 and/or some other example herein, wherein the operations further comprise: determining the device may be a non-AP MLD and the second transition peer may be in AP MLD; receiving a first group temporal key (GTK), a first integrity group temporal key (IGTK), or a first beacon integrity group transient key (BIGTK) associated with a first link between the non-AP MLD and the second transition peer in reassociation response; and receiving a second GTK, a second IGTK, or a second BIGTK associated with a second link between the non-AP MLD and the second transition peer in reassociation response.

Example 18 may include the non-transitory computer-readable medium of example 17 and/or some other example herein, wherein a multi-link GTK subelement of FTE, a multi-link IGTK subelement of FTE, or multi-link BIGTK subelement of FTE each comprises with one link ID associated with a link of the AP MLD plus the first GTK, first IGTK, or the first BIGTK.

Example 19 may include a method comprising: performing, by one or more processors, an initial association with a first transition peer; initiating a fast multi-link device (MLD) transition from the first transition peer to a second transition peer, wherein the MLD may be configured to use authentication keys, and wherein at least one of the first transition peer or the second transition peer it may be an access point (AP) MLD having a plurality of links associated with a plurality of APs within the AP MLD; including an MLD link identification (ID) within an fast basic service set transition element (FTE) of a reassociation request or reassociation response frame, wherein the MLD link ID identifies an individual link of the plurality of links; and performing a second association with the second transition peer.

Example 20 may include the method of example 19 and/or some other example herein, wherein the initial association comprises exchanging a multi-link element in a reassociation request or a reassociation response frame when the device may be a non-access point (AP) MLD and the first transition peer may be an AP multi-link device (MLD).

Example 21 may include the method of example 19 and/or some other example herein, wherein the initial association comprises exchanging a key data encapsulation (KDE) in message 2 and message 3 of a fast basic service set transition (FT) 4-way handshake when the device may be a non-access point (AP) MLD and the first transition peer may be an AP multi-link device (MLD) and wherein the KDE comprises one link ID associated with a link of the AP MLD plus STA MAC address fields for the link.

Example 22 may include the method of example 19 and/or some other example herein, further comprising: determining the device may be a non-AP MLD and the first transition peer may be an AP MLD, wherein the initial association comprises receiving a first group temporal key (GTK), a first integrity group temporal key (IGTK), or a first beacon integrity group transient key (BIGTK) associated with a first link between the non-AP MLD and the first transition peer in message 3 of fast basic service set transition (FT) 4-way handshake; and receiving a second GTK, a second IGTK, or a second BIGTK associated with a second link between the non-AP MLD and the first transition peer in message 3 of fast basic service set transition (FT) 4-way handshake.

Example 23 may include the method of example 22 and/or some other example herein, wherein a multi-link GTK KDE, a multi-link IGTK KDE, or a multi-link BIGTK KDE in message 3 of a fast basic service set transition (FT) 4-way handshake each comprises one link ID associated with a link of the AP MLD plus the first GTK, the first IGTK, or the first BIGTK.

Example 24 may include the method of example 19 and/or some other example herein, wherein the device may be a fast basic service set transition originator (FTO).

Example 25 may include the method of example 19 and/or some other example herein, wherein the FTE comprises a multi-link subelement of an, wherein the subelement comprises one link ID associated with a link of the AP MLD plus station device (STA) medium access control (MAC) address fields.

Example 26 may include the method of example 19 and/or some other example herein, further comprising: determining the device may be a non-AP MLD and the second transition peer may be in AP MLD; receiving a first group temporal key (GTK), a first integrity group temporal key (IGTK), or a first beacon integrity group transient key (BIGTK) associated with a first link between the non-AP MLD and the second transition peer in reassociation response; and receiving a second GTK, a second IGTK, or a second BIGTK associated with a second link between the non-AP MLD and the second transition peer in reassociation response.

Example 27 may include the method of example 26 and/or some other example herein, wherein a multi-link GTK subelement of FTE, a multi-link IGTK subelement of FTE, or multi-link BIGTK subelement of FTE each comprises with one link ID associated with a link of the AP MLD plus the first GTK, first IGTK, or the first BIGTK.

Example 28 may include an apparatus comprising means for: performing an initial association with a first transition peer; initiating a fast multi-link device (MLD) transition from the first transition peer to a second transition peer, wherein the MLD may be configured to use authentication keys, and wherein at least one of the first transition peer or the second transition peer it may be an access point (AP) MLD having a plurality of links associated with a plurality of APs within the AP MLD; including an MLD link identification (ID) within an fast basic service set transition element (FTE) of a reassociation request or reassociation response frame, wherein the MLD link ID identifies an individual link of the plurality of links; and performing a second association with the second transition peer.

Example 29 may include the apparatus of example 28 and/or some other example herein, wherein the initial association comprises exchanging a multi-link element in a reassociation request or a reassociation response frame when the device may be a non-access point (AP) MLD and the first transition peer may be an AP multi-link device (MLD).

Example 30 may include the apparatus of example 28 and/or some other example herein, wherein the initial association comprises exchanging a key data encapsulation (KDE) in message 2 and message 3 of a fast basic service set transition (FT) 4-way handshake when the device may be a non-access point (AP) MLD and the first transition peer may be an AP multi-link device (MLD) and wherein the KDE comprises one link ID associated with a link of the AP MLD plus STA MAC address fields for the link.

Example 31 may include the apparatus of example 28 and/or some other example herein, further comprising: determining the device may be a non-AP MLD and the first transition peer may be an AP MLD, wherein the initial association comprises receiving a first group temporal key (GTK), a first integrity group temporal key (IGTK), or a first beacon integrity group transient key (BIGTK) associated with a first link between the non-AP MLD and the first transition peer in message 3 of fast basic service set transition (FT) 4-way handshake; and receiving a second GTK, a second IGTK, or a second BIGTK associated with a second link between the non-AP MLD and the first transition peer in message 3 of fast basic service set transition (FT) 4-way handshake.

Example 32 may include the apparatus of example 31 and/or some other example herein, wherein a multi-link GTK KDE, a multi-link IGTK KDE, or a multi-link BIGTK KDE in message 3 of a fast basic service set transition (FT) 4-way handshake each comprises one link ID associated with a link of the AP MLD plus the first GTK, the first IGTK, or the first BIGTK.

Example 33 may include the apparatus of example 28 and/or some other example herein, wherein the device may be a fast basic service set transition originator (FTO).

Example 34 may include the apparatus of example 28 and/or some other example herein, wherein the FTE comprises a multi-link subelement of an, wherein the subelement comprises one link ID associated with a link of the AP MLD plus station device (STA) medium access control (MAC) address fields.

Example 35 may include the apparatus of example 28 and/or some other example herein, further comprising: determining the device may be a non-AP MLD and the second transition peer may be in AP MLD; receiving a first group temporal key (GTK), a first integrity group temporal key (IGTK), or a first beacon integrity group transient key (BIGTK) associated with a first link between the non-AP MLD and the second transition peer in reassociation response; and receiving a second GTK, a second IGTK, or a second BIGTK associated with a second link between the non-AP MLD and the second transition peer in reassociation response.

Example 36 may include the apparatus of example 35 and/or some other example herein, wherein a multi-link GTK subelement of FTE, a multi-link IGTK subelement of FTE, or multi-link BIGTK subelement of FTE each comprises with one link ID associated with a link of the AP MLD plus the first GTK, first IGTK, or the first BIGTK.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a non-access point (AP) station device (STA), the apparatus comprising processing circuitry coupled to a storage, the processing circuitry configured to:

perform an initial association with a current AP during an over-the-air fast basic service set (BSS) transition (FT), wherein the initial association comprises exchanging a key data encapsulation (KDE) in message 2 and message 3 of a fast basic service set transition (FT) 4-way handshake, and wherein the KDE comprises one or more repetitions of a Link ID field coupled with station device (STA) medium access control (MAC) address fields;

initiate a fast transition from the current AP to a target AP, wherein at least one of the current AP or the target AP is a multi-link device (MLD) having a plurality of links associated with a plurality of APs affiliated with an AP MLD;

include a multi-link element in a reassociation request frame or a reassociation response frame, wherein the multi-link element is present when the target AP is the AP MLD;

receive the reassociation response frame further comprising at least one of a multi-link group temporal key (MLO GTK) subelement, a multi-link integrity group temporal key (MLO IGTK) subelement, or a multi-link beacon integrity group transient key (MLO BIGTK) subelement, wherein each of the subelements comprises a link identification (ID) field that specifies a link of the AP MLD to which a key in the subelement is applied; and perform a transition from the current AP to the target AP.

2. The apparatus of claim 1, wherein a non-AP MLD is configured to include the STA MAC address KDE for a different link in message 2 of the FT 4-way handshake.

3. The apparatus of claim 1, wherein the AP MLD is configured to include an STA MAC address KDE for a different link in message 3 of the FT 4-way handshake.

4. The apparatus of claim 1, wherein a multi-link group temporal key (GTK) KDE, a multi-link integrity group temporal key (IGTK) KDE, or a multi-link beacon integrity group transient key (BIGTK) KDE is used in message 3 of the FT 4-way handshake each comprising one link ID associated with a link of the AP MLD.

5. The apparatus of claim 1, wherein the non-AP STA is a fast basic service set transition originator (FTO).

6. The apparatus of claim 1, wherein each AP affiliated with the AP MLD shares a same service set identifier (SSID) and is part of a same extended service set (ESS).

7. The apparatus of claim 1, further comprising a transceiver configured to transmit and receive wireless signals.

8. The apparatus of claim 7, further comprising an antenna coupled to the transceiver.

9. A non-transitory computer-readable medium storing computer-executable instructions which when executed by one or more processors of a non-access point (AP) station device (STA) result in performing operations comprising:

performing an initial association with a current AP during an over-the-air fast basic service set (BSS) transition (FT), wherein the initial association comprises exchanging a key data encapsulation (KDE) in message 2 and message 3 of a fast basic service set transition (FT) 4-way handshake, and wherein the KDE comprises one or more repetitions of a Link ID field coupled with station device (STA) medium access control (MAC) address fields;

initiating a fast transition from the current AP to a target AP, wherein at least one of the current AP or the target AP is a multi-link device (MLD) having a plurality of links associated with a plurality of APs affiliated with an AP MLD;

including a multi-link element in a reassociation request frame or a reassociation response frame, wherein the multi-link element is present when the target AP is the AP MLD;

receiving the reassociation response frame further comprising at least one of a multi-link group temporal key (MLO GTK) subelement, a multi-link integrity group temporal key (MLO IGTK) subelement, or a multi-link beacon integrity group transient key (MLO BIGTK) subelement, wherein each of the subelements comprises a link identification (ID) field that specifies a link of the AP MLD to which a key in the subelement is applied; and performing a transition from the current AP to the target AP.

10. The non-transitory computer-readable medium of claim 9, wherein a non-AP MLD is configured to include an STA MAC address key data encapsulation (KDE) for a different link in message 2 of the FT 4-way handshake.

11. The non-transitory computer-readable medium of claim 9, wherein the AP MLD is configured to include an STA MAC address key data encapsulation (KDE) for a different link in message 3 of the FT 4-way handshake.

12. The non-transitory computer-readable medium of claim 9, wherein a multi-link group temporal key (GTK) KDE, a multi-link integrity group temporal key (IGTK) KDE, or a multi-link beacon integrity group transient key (BIGTK) KDE is used in message 3 of the FT 4-way handshake each comprising one link ID associated with a link of the AP MLD.

13. The non-transitory computer-readable medium of claim 9, wherein the device is a fast basic service set transition originator (FTO).

14. The non-transitory computer-readable medium of claim 9, wherein each AP affiliated with the AP MLD shares a same service set identifier (SSID) and is part of a same extended service set (ESS).

15. A method comprising:

performing, by one or more processors of a non-access point (AP) station device (STA), an initial association with a current AP during an over-the-air fast basic service set (BSS) transition (FT), wherein the initial association comprises exchanging a key data encapsulation (KDE) in message 2 and message 3 of a fast basic service set transition (FT) 4-way handshake, and wherein the KDE comprises one or more repetitions of a Link ID field coupled with station device (STA) medium access control (MAC) address fields;

initiating a fast transition from the current AP to a target AP, wherein at least one of the current AP or the target AP is a multi-link device (MLD) having a plurality of links associated with a plurality of APs affiliated with an AP MLD;

including a multi-link element in a reassociation request frame or a reassociation response frame, wherein the multi-link element is present when the target AP is the AP MLD;

receiving the reassociation response frame further comprising at least one of a multi-link group temporal key (MLO GTK) subelement, a multi-link integrity group temporal key (MLO IGTK) subelement, or a multi-link beacon integrity group transient key (MLO BIGTK) subelement, wherein each of the subelements comprises a link identification (ID) field that specifies a link of the AP MLD to which a key in the subelement is applied; and performing a transition from the current AP to the target AP.

* * * * *